(12) United States Patent  (10) Patent No.: US 8,281,541 B2
Lucey et al.  (45) Date of Patent: Oct. 9, 2012

(54) HOLD DOWN CONNECTOR

(75) Inventors: Robert D. Lucey, Temecula, CA (US); Ronald F. Nelson, Hermosa Beach, CA (US)

(73) Assignee: MiTek Holdings, Inc., Wilmington, DE (US)

( * ) Notice: Subject to any disclaimer, the term of this patent is extended or adjusted under 35 U.S.C. 154(b) by 1045 days.

(21) Appl. No.: 12/205,638

(22) Filed: Sep. 5, 2008

(65) Prior Publication Data

US 2010/0058681 A1   Mar. 11, 2010

(51) Int. Cl.
*E04B 1/38* (2006.01)
(52) U.S. Cl. .......................... 52/706; 52/715; 403/232.1
(58) Field of Classification Search .................... 52/703, 52/706, 712, 715, 92.1, 93.1, 702; 403/168, 403/232.1, 233, 235, 237
See application file for complete search history.

(56) References Cited

U.S. PATENT DOCUMENTS

| | | | |
|---|---|---|---|
| 5,813,181 A | 9/1998 | Ashton et al. | |
| 5,921,042 A | 7/1999 | Ashton et al. | |
| 6,112,486 A | 9/2000 | Ashton et al. | |
| 6,138,425 A * | 10/2000 | Wendt | 52/506.07 |
| 6,389,767 B1 | 5/2002 | Lucey et al. | |
| 6,425,220 B1 | 7/2002 | Ashton et al. | |
| 6,564,519 B2 | 5/2003 | Lucey et al. | |
| 6,625,945 B2 * | 9/2003 | Commins | 52/293.3 |
| 6,826,882 B2 | 12/2004 | Lucey et al. | |
| 7,104,024 B1 * | 9/2006 | diGirolamo et al. | 52/710 |
| 7,171,789 B2 | 2/2007 | Lucey et al. | |
| 2005/0108986 A1 | 5/2005 | Cloyd et al. | |
| 2006/0021291 A1 * | 2/2006 | Leek et al. | 52/293.3 |
| 2007/0014630 A1 | 1/2007 | Brown | |
| 2007/0137125 A1 | 6/2007 | Lucey et al. | |
| 2008/0295428 A1 | 12/2008 | Cloyd et al. | |

* cited by examiner

*Primary Examiner* — William Gilbert
(74) *Attorney, Agent, or Firm* — Senniger Powers LLP

(57) ABSTRACT

A hold down connector is provided for securing together multiple building members. The hold down connector resists movement of the building members when connected to an elongated tie member. In one embodiment, the hold down connector includes a transverse portion connected to first and second elongated legs with at least one aperture at elongated connections between the transverse portion and the first leg and between the transverse portion and second leg. In another embodiment, the hold down connector includes a transverse portion connected to first and second elongated legs with the transverse portion partially supported by transverse extensions of the first and second legs. A hold down connector in accordance with embodiments results in increased load bearing properties, construction from thicker materials, and easy installation.

53 Claims, 22 Drawing Sheets

HOLD DOWN CONNECTOR

INCORPORATION BY REFERENCE

The present application incorporates by reference the following patents and applications in their entirety: U.S. Pat. No. 5,813,181, to Ashton et al.; U.S. Pat. No. 6,389,767, to Lucey et al.; and U.S. Patent Application Publication No. 2007-0014630 A1 to Brown et al.

BACKGROUND OF THE INVENTION

1. Field of the Invention

This application relates to building construction and reinforcement in general, and specifically to an improved hold down connector for strengthening the performance of building structures in response to forces generated by seismic waves and other external forces.

2. Description of the Related Art

Various methods of reinforcing buildings from seismic forces, such as earthquakes, are known in the art. An exemplary continuity tie and continuity tie system for securing together multiple building members is disclosed in U.S. Pat. No. 5,813,181. The continuity system provides resistance to externally induced movement of building structural members. The system includes continuity ties, or "hold downs," secured to building structural members such as studs, and threaded rods that secure the continuity ties to one another.

A shear wall is a wall segment designed to act as a primary load path for loads transmitted through a building. An exemplary shear wall construction is disclosed in U.S. Pat. No. 6,389,767. The shear wall construction includes a pair of generally vertical spaced studs, a channel member hold down sandwiched between and attached to each stud, and a rod extending through and connected to the hold down. The shear wall can be manufactured on site or pre-fabricated. The shear wall can then be installed in a building to provide additional resistance to externally induced movement.

SUMMARY OF THE INVENTION

A need exists for an apparatus capable of securing multiple building members and withstanding large tension forces, such as forces generated by seismic waves and other external forces.

In accordance with one aspect of the present invention, a hold down connector for securing together multiple building members is provided. The hold down connector includes: a first elongated portion configured to laterally receive one or more fasteners for fastening the first portion to an elongated stud, the first portion including one or more first transverse extensions; a second elongated portion configured to laterally receive one or more fasteners for fastening the second portion to an elongated stud, the second portion being substantially parallel to the first portion, the second portion including one or more second transverse extensions; and a transverse portion having first and second ends. The first end is connected to a top end of the first portion, and the second end is connected to a top end of the second portion. The transverse portion is partially supported by the first and second transverse extensions, and has a tie mounting aperture configured to receive an elongated tie member.

In accordance with another aspect of the present invention, a method for securing together multiple building members is provided. The method includes: providing a first elongated portion configured to laterally receive one or more fasteners for fastening the first portion to an elongated stud, the first portion including one or more first transverse extensions; providing a second elongated portion configured to laterally receive one or more fasteners for fastening the second portion to an elongate stud, the second portion being substantially parallel to the first portion, the second portion including one or more second transverse extensions; and providing a transverse portion having first and second ends. The first end is connected to a top end of the first portion, and the second end is connected to a top end of the second portion. The transverse portion is partially supported by the first and second transverse extensions and has a tie mounting aperture configured to receive an elongated tie member.

In accordance with another aspect of the present invention, a hold down connector is provided for securing together multiple building members. The hold down connector includes: a first elongated portion configured to laterally receive one or more fasteners for fastening the first portion to an elongated stud; a second elongated portion configured to laterally receive one or more fasteners for fastening the second portion to an elongated stud, wherein the second portion is substantially parallel to the first portion; and a transverse portion having first and second ends. The first end is connected to an end of the first portion, and the second end is connected to an end of the second portion. The transverse portion has a tie mounting hole configured to receive an elongated tie member. The hold down connector includes at least one aperture at an elongated connection between the transverse portion and the first portion. The hold down connector also includes at least one aperture at an elongated connection between the transverse portion and the second portion.

In accordance with another aspect of the present invention, a method for securing different building members is provided. The method includes: providing a first elongated portion configured to laterally receive one or more fasteners for fastening the first portion to an elongated stud; providing a second elongated portion configured to laterally receive one or more fasteners for fastening the second portion to an elongated stud, wherein the second portion is substantially parallel to the first portion; and providing a transverse portion having first and second ends. The first end is connected to an end of the first portion, and the second end is connected to an end of the second portion. The transverse portion has a tie mounting aperture configured to receive an elongated tie member. The hold down connector includes at least one aperture at an elongated connection between the transverse portion and the first portion, and at least one aperture at an elongated connection between the transverse portion and the second portion.

The hold down connector has increased load bearing capabilities because it can be fabricated out of thicker materials and the transverse extensions provide additional support to the transverse portion. Consequently, buildings reinforced by hold down connectors in accordance with embodiments can withstand increased seismic forces without structural failure. The hold down connector is also relatively simple to fabricate and install in new and old buildings.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment(s) disclosed.

The figures are not necessarily drawn to scale.

DETAILED DESCRIPTION OF THE PREFERRED EMBODIMENTS

Prior hold downs exist for securing first and second studs, in a portion of a building, with respect to a foundation. For example, U.S. Pat. No. 6,625,945 to Commins provides such a hold down. However, the Commins hold down has certain disadvantages, such as: inability to support large tension loads, inability to construct the hold down from thicker materials, and installation difficulties. The Commins hold down is not capable of supporting large tension loads because of the location of the base with respect to the first and second flanges. The location of the base in the Commins hold down is also more vulnerable to deflection under loads because it is not reinforced from below, and as such, is rated for lower capacities under applicable building codes. Furthermore, the design includes sharp corners that are only possible if the hold down in made of thinner materials. The Commins hold down can also create installation difficulties in certain configurations, such as when installed with a cinch nut or take-up device because it is more difficult for the installer to access the space and install the cinch nut or take-up device between the first and second flanges.

A need exists for a hold down connector that is easy to install in new and old buildings, and which can withstand large tensile and compressive loads created by seismic events, wind, and other forces. Hold down connectors in accordance with certain embodiments are installed between two elongated beams, such as wooden studs. In some embodiments, the hold down connector can be attached to only one stud. In certain embodiments, the hold down connector may be connected to an elongated tie member (e.g., a rod) adapted to be in tension and, in some embodiments, in compression also. An end of the tie member is typically connected to the building at another point, such as being anchored in a foundation or floor, or being secured to another hold down connector. During a seismic event, this hold down assembly substantially prevents the building members from moving with respect to the foundation, floor, or wherever the opposing end of the tie member is connected.

Figure 1:
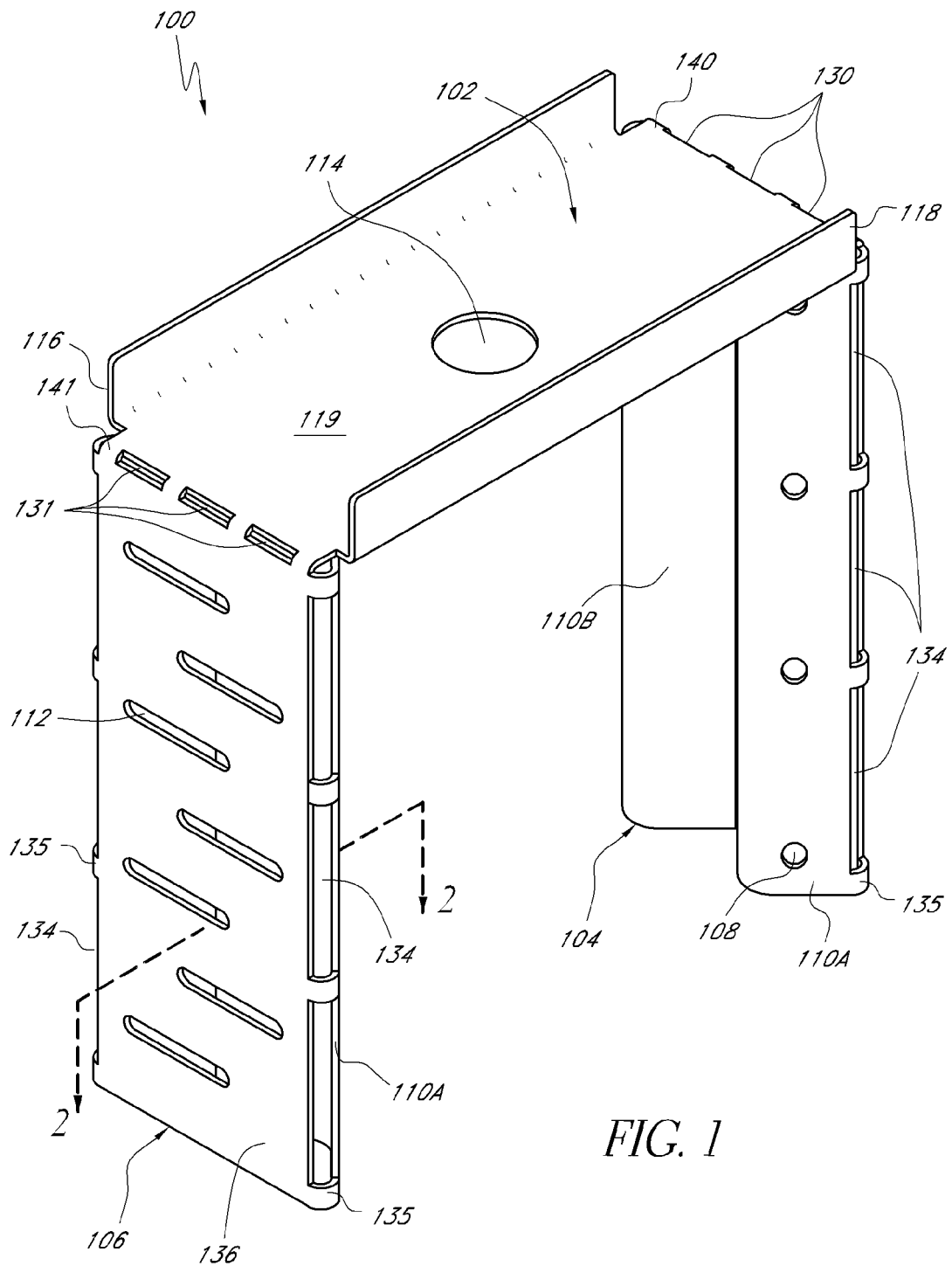
FIG. 1 is a top perspective view of a hold down connector in accordance with one embodiment.

FIGS. 1-18 illustrate various apparatuses in accordance with embodiments. FIG. 1 is a top view of one embodiment of a hold down connector 100. A transverse portion 102 is connected to a top end of the first elongated portion or leg 104 and to a second elongated portion or leg 106. As used herein, "transverse" means the horizontal direction in the view of FIG. 1. In the illustrated embodiment, the ends of transverse portion 102 are connected to top ends of legs 104, 106, while in other embodiments legs 104, 106 may extend above the transverse portion 102. The transverse portion 102, first leg 104, and second leg 106 are preferably formed from a single plate, bent into the illustrated shape. The first leg 104 and second leg 106 are preferably substantially parallel.

Figure 15:
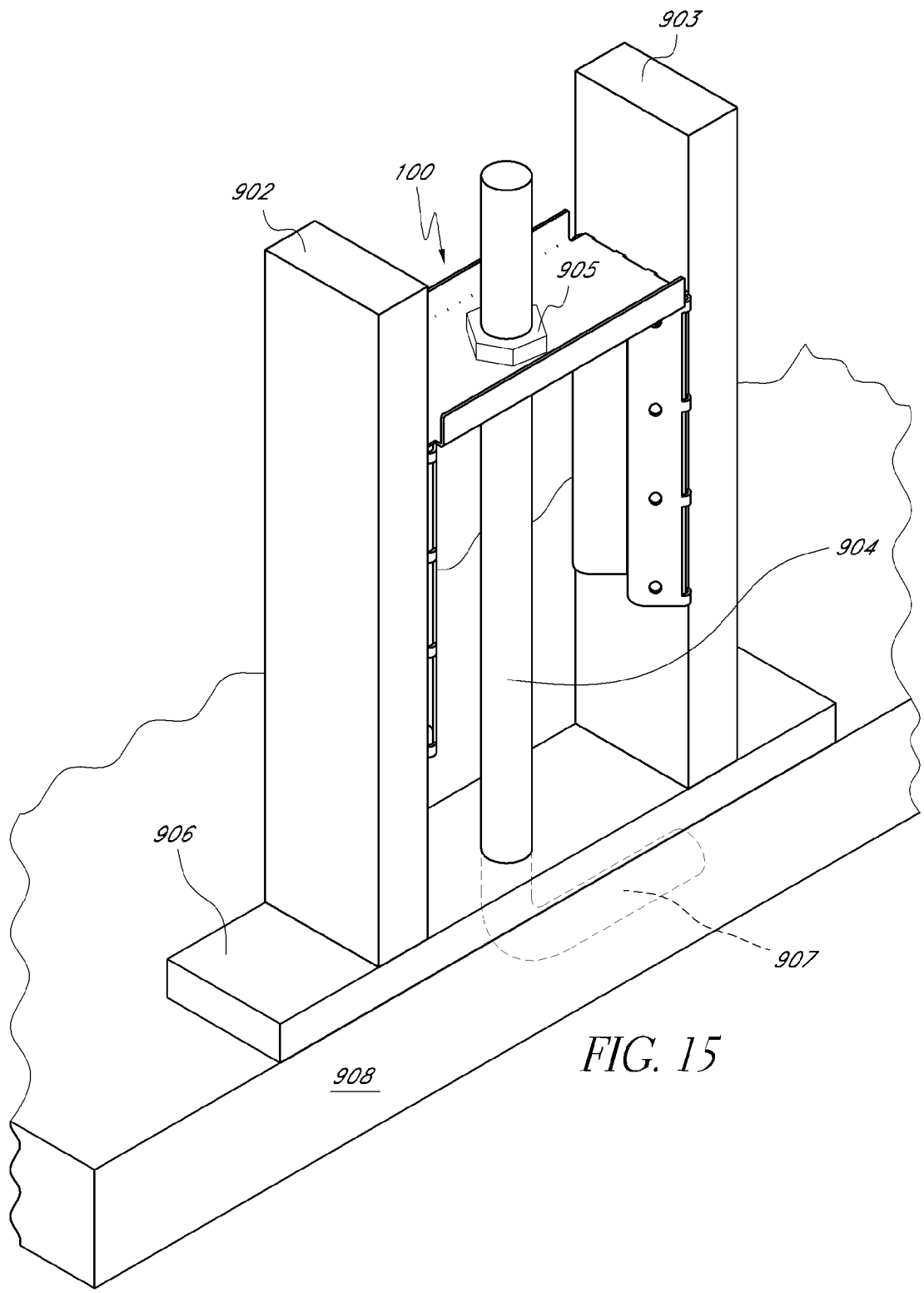
FIG. 15 is a top perspective view of a hold down connector assembly in accordance with one embodiment.

The first leg 104 and second leg 106 are preferably, but not necessarily, substantially identical. Each leg 104, 106 preferably includes one or more transverse extensions 110. In the illustrated embodiment, each leg 104, 106 includes a pair of transverse extensions 110A and 110B. Each transverse extension preferably has slots, openings, or holes 108 each capable of laterally receiving an elongated fastener. In some embodiments, the transverse extensions 110A and 110B either abut or are secured to a main body 119 of the transverse portion 102 to provide support thereto. Each leg 104, 106 includes a main body 136 (which is preferably substantially planar) configured such that it can be connected to an elongated stud, as shown in FIG. 15 and described below. The main bodies 136 can include holes capable of laterally receiving the fasteners. In a preferred arrangement, a flat surface of the main body 136 bears against a flat surface of the stud. The main body 136 can include slots, openings, or holes 112 capable of receiving the fasteners. Suitable fasteners include, without limitation: screws, nails, bolts, pins, etc.

The transverse portion 102 preferably has a tie mounting opening or hole 114 configured to receive an elongated tie member (FIGS. 15-17), such as a threaded rod. In this embodiment, the transverse portion 102 has vertical extensions 116 and 118 extending above the main body 119. In some embodiments the vertical extensions 116 and 118 are omitted. The region between the vertical extensions 116 and 118 can accommodate a reinforcement plate (described in further detail below with respect to FIGS. 4-5) to provide additional reinforcement to the transverse portion 102. The reinforcement plate can also include a hole configured to receive the aforementioned elongated tie member.

With continued reference to FIG. 1, the hold down connector 100 preferably includes apertures 130 oriented in substantial alignment with an elongated connection or "bend" 140 between the transverse portion 102 and the first leg 104. Other embodiments can include apertures 130 without any particular orientation, such as circular holes. The hold down connector 100 also preferably has apertures 131 along, and preferably oriented in substantial alignment with, an elongated connection or "bend" 141 defined between the transverse portion 102 and second leg 106. The apertures 130 and 131 can facilitate manufacturing of the hold down connector 100. For example, the apertures 130 and 131 can help to isolate the bends 140, 141 of the material at the desired locations. Thicker materials, such as metals, typically do not form sharp and straight corners when they are bent, instead producing a more rounded bend with bowing along each side thereof. Providing one or more apertures along the corner area facilitates bending of the material, and promotes the formation of consistently shaped corners. The apertures 130 and 131 can be configured in a variety of ways. In some embodiments there is only one such aperture between the transverse portion 102 and each leg 104, 106. In other embodiments, there are multiple such apertures at each elongated connection 140, 141. The apertures 130, 131 can be ovular, circular, or other shapes.

In some embodiments the apertures 130, 131, and 134 (FIG. 1) and 630, 631 (FIG. 6), and 832 (FIG. 14) are omitted.

FIG. 1 further illustrates optional apertures 134 along an elongated connection or bend between 135 a side edge of the main body of the first leg 104 and the transverse extension 110A. Apertures 134 can also be provided along an elongated connection between an opposite side edge of the main body of the first leg 104 and the transverse extension 110B. Such apertures are preferably on both sides edges of each main body 136. The elongated connection 135 is preferably substantially parallel to the longitudinal axes of the first leg 104 and second leg 106. As noted above, the main bodies 136 and transverse extensions 110A, 110B can comprise plates. FIG. 1 also illustrates apertures 134 in the second leg 106 at an elongated connection 135 between a side edge of the main body 136 and one transverse extension 110A. The one or more apertures 134 facilitate manufacturing of the hold down connector 100, making it easier to bend the plate at the desired locations by relieving internal stresses. As explained above, thicker materials can pose problems when they are bent, often resulting in rounded bowing as opposed to sharp corners. Providing one or more apertures reduces internal stresses along the elongated connection and results in easier manufacturing, more consistent corner formation, and an ability to fabricate the hold down connector out of thicker materials. The apertures 134 can have a variety of different shapes such as, without limitation, elongated slits, ovals, circles, or other shapes.

Installing the hold down connector 100 of FIG. 1 is relatively easy. The hold down connector 100 is preferably configured to fit between substantially parallel elongated building studs or members. In certain embodiments, the length of the transverse portion 102 is preferably (without limitation) about 3" to 24", and more preferably between 3" and 8." The main bodies 136 of the first portion 104 and second portion 106 preferably abut and are fastened to the elongated building studs. The fasteners can extend laterally through the openings 108 of the transverse extensions 110A and 110B and the openings 112 in the main bodies 136 of the legs 104, 106 to fasten the legs to the elongated studs. In the illustrated embodiment, the portions of the transverse extensions 110A and 110B that include the openings 108 form an angle with respect to the main body portion 136. The angle makes it easier to drive the fasteners via screwdriver, hammer, or other means without the opposing leg getting in the way. The openings 108 in the transverse extensions 110A and 110B and the openings 112 in the main bodies 136 of the first and second legs 104, 106 both contact the fasteners. In one embodiment, the openings 108 of each 110A or 110B are substantially linearly aligned. In another embodiment, the openings 108 of each transverse extension 110A and 110B are non-aligned or staggered to provide additional shear support and prevent fasteners from contacting each other when installed in an elongated building stud. This results in increased shear support from each fastener because each fastener supports the hold down connector at two locations instead of one.

The hold down connector 100 can be made out of any rigid material that can be formed or bent into the desired shape, yet can withstand the loads expected of a continuity system. The hold down connector 100 is preferably made out of metal, or galvanized steel. The hold down connector 100 is preferably made out of 12 to 20 gauge galvanized steel. In one embodiment, the hold down connector 100 is made out of 14 gauge galvanized steel. The hold down connector material preferably is thicker than about 0.0396," and more preferably is between about 0.0396" and about 0.11" thick. In one embodiment, the hold down connector material is about 0.0785" thick. The hold down connector 100 can be integrally formed from a single piece or sheet of material and cut and folded into the desired shape. In some embodiments, one end of the transverse portion 102 is integrally formed with an end of first leg 104 and the other end of the transverse portion 102 is integrally formed with an end of the second leg 106. The hold down connector 100 can also be welded together or assembled from multiple pieces of material.

Applicable building codes require in some instances that the connector support 10,000 ft-lbs of force without exceeding a defined amount of deflection. As a result, thicker material or additional reinforcement may be desirable for embodiments with longer transverse portions 102 to prevent deflection of the transverse portion.

Figure 2:
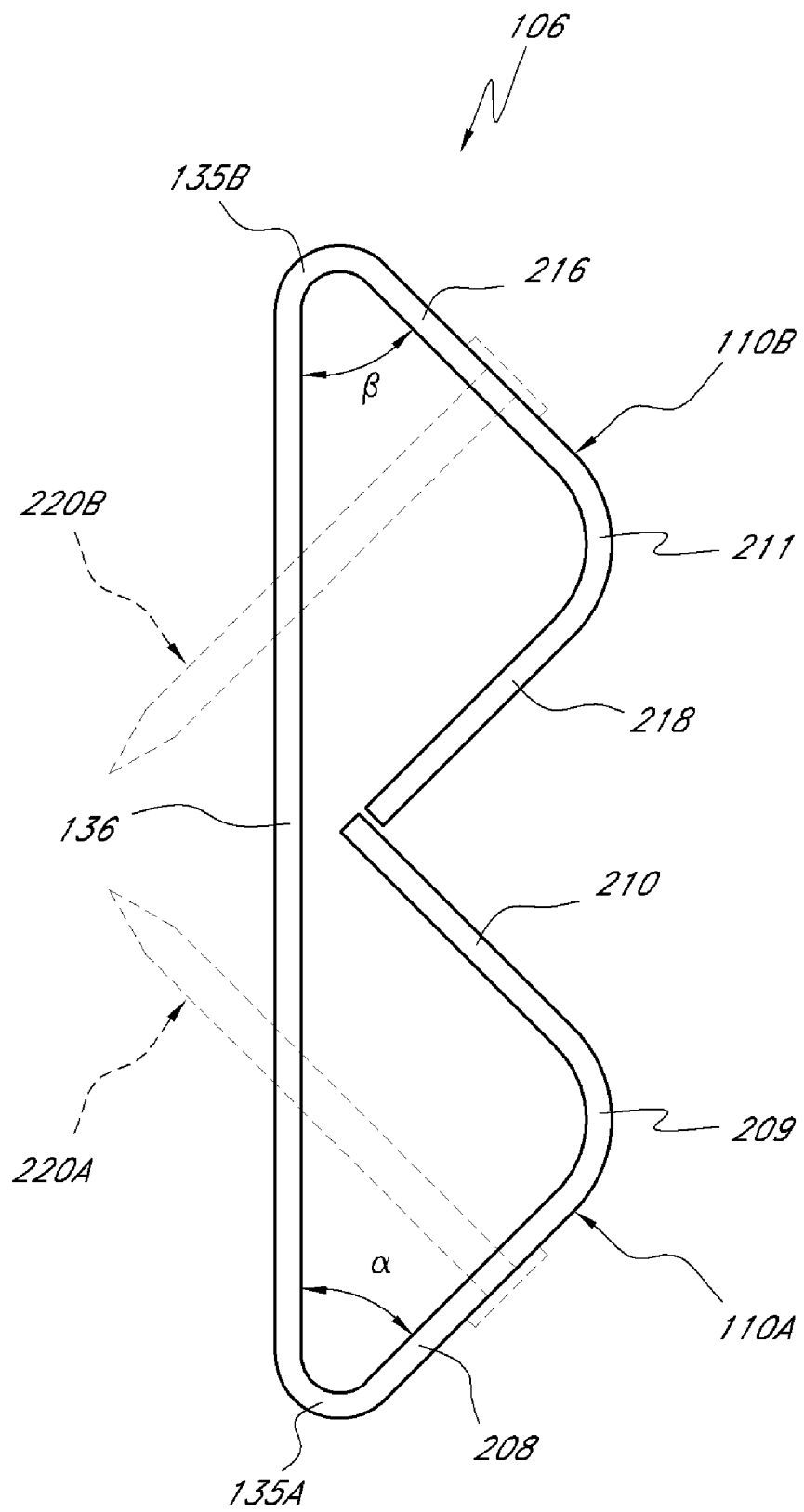
FIG. 2 is a cross-sectional view taken along line 2-2 of FIG. 1.

FIG. 2 is a cross-sectional view of the leg 106 of FIG. 1. The first portion or leg 104 is preferably similarly shaped. The illustrated cross section shows the main body 136, a first elongated connection 135A between a side edge of the main body 136 and a transverse extension 110A. A portion 208 of the transverse extension 110A extends transversely from the main body 136 towards the first leg 104 (FIG. 1) and forms an angle a that is preferably less than 90° with respect to the main body 136. The transverse extension 110A is then bent back at 209 to define an end portion 210 that extends toward the main body 136.

Another transverse extension 110B extends from an opposite side edge of the main body 136 at an elongated connection 135B. A portion 216 of the first transverse extension 110B extends transversely from the main body portion 136 towards the first leg 104 (FIG. 1) and forms an angle β that is preferably less than 90° with respect to the main body 136. The transverse extension 110B is then bent at 211 to define an end portion 218 that extends toward the main body 136.

The illustrated cross section of the transverse extensions 110A and 110B of the second portion or leg 106 is substantially W-shaped. One of skill in the art can appreciate that the cross section of the transverse extensions 110A and 110B can have many different shapes, including without limitation: semi-circular, trapezoidal, triangular, rectangular, etc. The transverse extensions 110A and 110B can be shaped in any way that extends transversely towards the other substantially parallel portion or leg 104, and that preferably allows the transverse extensions 110A and 110B to support the transverse portion 102 (FIG. 1).

In preferred embodiments, the upper edges of the transverse extensions 110A and 110B contact and support the transverse portion 102. In some embodiments, the transverse extensions 110A and 110B can also be secured to the transverse portion 102. The support provided by the transverse extensions 110A and 110B to the transverse portion 102 results in a significant increase in the load bearing properties of the hold down connector 100, both in tension and, if the transverse extensions are secured to the transverse portion, 102, compression of the tie member.

As noted above, the first and second portions 104, 106 can be configured to laterally receive one or more fasteners for fastening the portion to an elongated stud. In the embodiment illustrated in FIG. 2, the portion is configured with openings 108 (FIG. 1) in portions 208 and 216 to laterally receive nails, screws, bolts, or other fasteners. Fasteners 220A and 220B are shown in FIG. 2. The main body 136 also has openings 112 (FIG. 1) preferably substantially vertically aligned with the openings 108 in portions 208 and 216. There will typically be limited space between the legs 104, 106, making it difficult to drive the fasteners 220A and 220B. In other words, a hand and forearm, hammer, or nail gun may not fit in the space between the legs or studs. The angles α and β between portions 208 and 216 and the main body 136 are preferably chosen to provide easy access for fastening the second portion 106 to an elongated stud. The angle allows for the fasteners 220A to be easily driven through the leg and into the stud without the need for fitting a hand and forearm, drill, nail gun, hammer, etc. in the area between the legs 104, 106.

Figure 3:
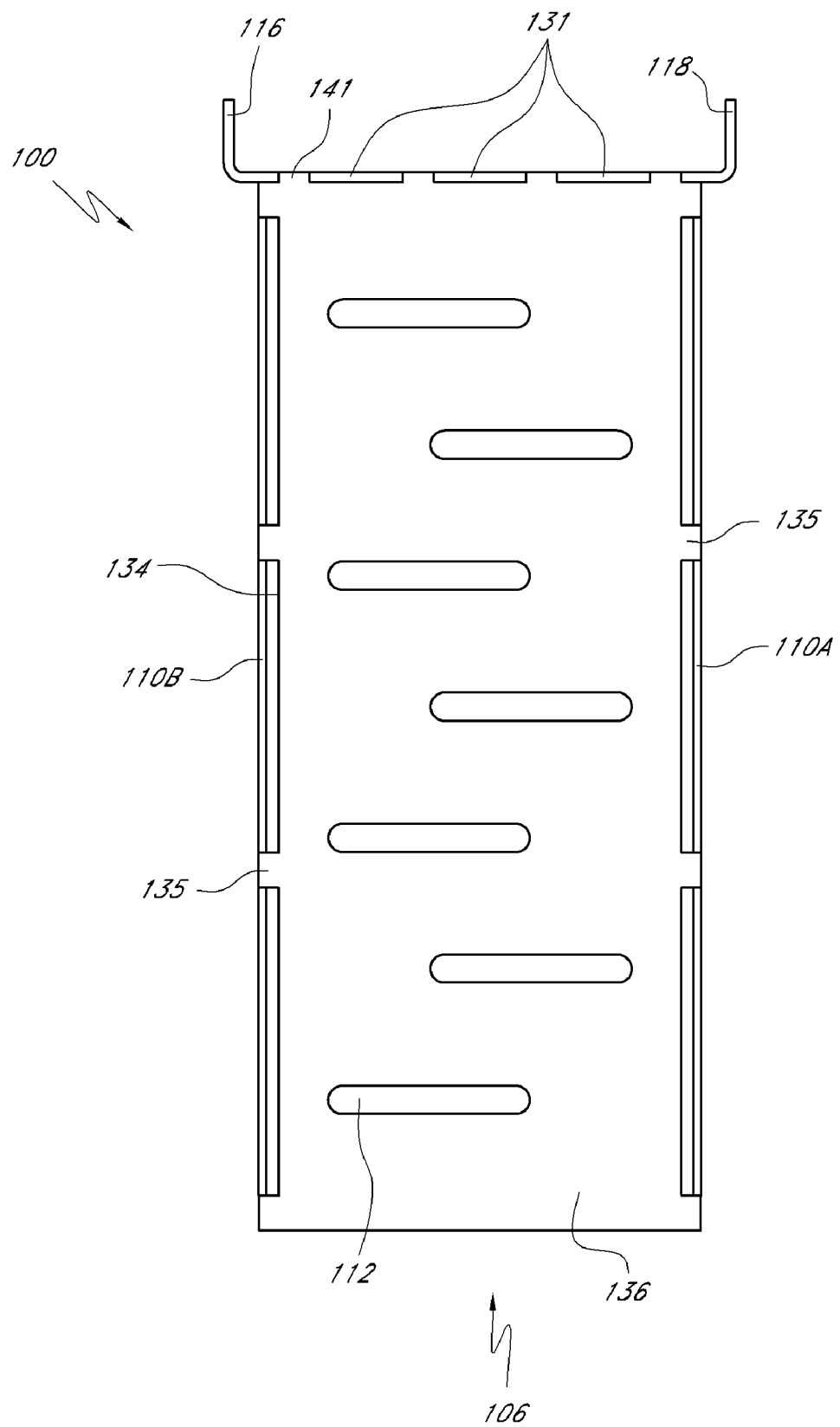
FIG. 3 is a side view of the hold down connector of FIG. 1.

FIG. 3 is a side view of the hold down connector 100 of FIG. 1. The illustrated leg 106 has a main body 136 containing openings 112 configured to laterally receive one or more fasteners 220 (FIG. 2) for fastening the leg 106 to an elongated stud. The illustrated openings 112 are elongated slots with rounded ends. However, one of skill in the art will appreciate that any suitable shape can be used that can accommodate a fastener 220. Typically, when the hold down connector 100 is fastened between building studs, the main body 136 of the first or second leg 106 abuts the elongated stud or building member. FIG. 3 also illustrates the apertures 134 and elongated connections 135 between the main body 136 and transverse extensions 110A and 110B (FIGS. 1-2). The one or more apertures 134 can vary in length, arrangement, and shape. As explained above, the apertures 134 facilitate bending of the material of the first and second legs 104, 106, particularly for thicker materials. FIG. 3 also illustrates the apertures 131 along the elongated connection 141 between the main body 136 and the transverse portion 102 (FIG. 1). The vertical extensions 116 and 118 of the transverse portion 102 are also shown.

Figure 4:
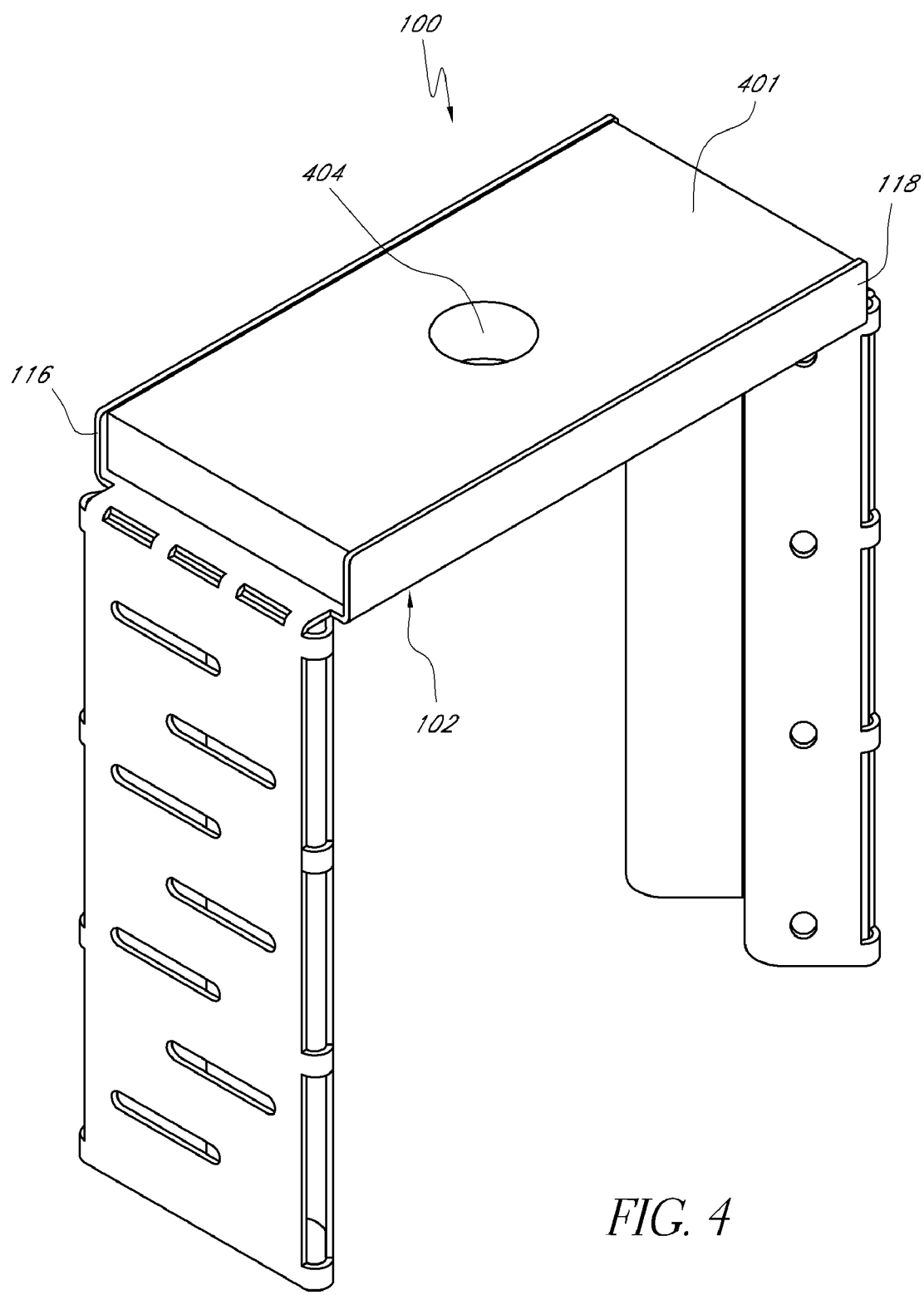
FIG. 4 is a top perspective view of a hold down connector in accordance with another embodiment.

FIG. 4 is a top perspective view of the hold down connector of FIG. 1 in combination with a reinforcement plate 401 located between the vertical extensions 116 and 118 and supported by the transverse portion 102. The reinforcement plate 401 preferably contains an opening or hole 404 capable of receiving an elongated tie member. The reinforcement plate's hole 404 is preferably configured to substantially line up with the hole 114 (FIG. 1) of the transverse portion 102, when the plate 401 rests on the transverse portion 102 between the vertical extensions 116 and 118. In one embodiment the holes 404 and 102 are substantially the same size and shape. FIG. 4 shows a single block as the support plate 401, although multiple support plates of various materials could be used as well. When an elongated tie member is engaged with the hold down connector 100 the tie member can pull down on the transverse portion 102 and support plate 401. The reinforcement plate 401 provides additional support to the transverse portion 102 of the hold down connector 100. The reinforcement plate 401 allows the hold down connector 100 to support greater loads than otherwise possible.

Figure 5:
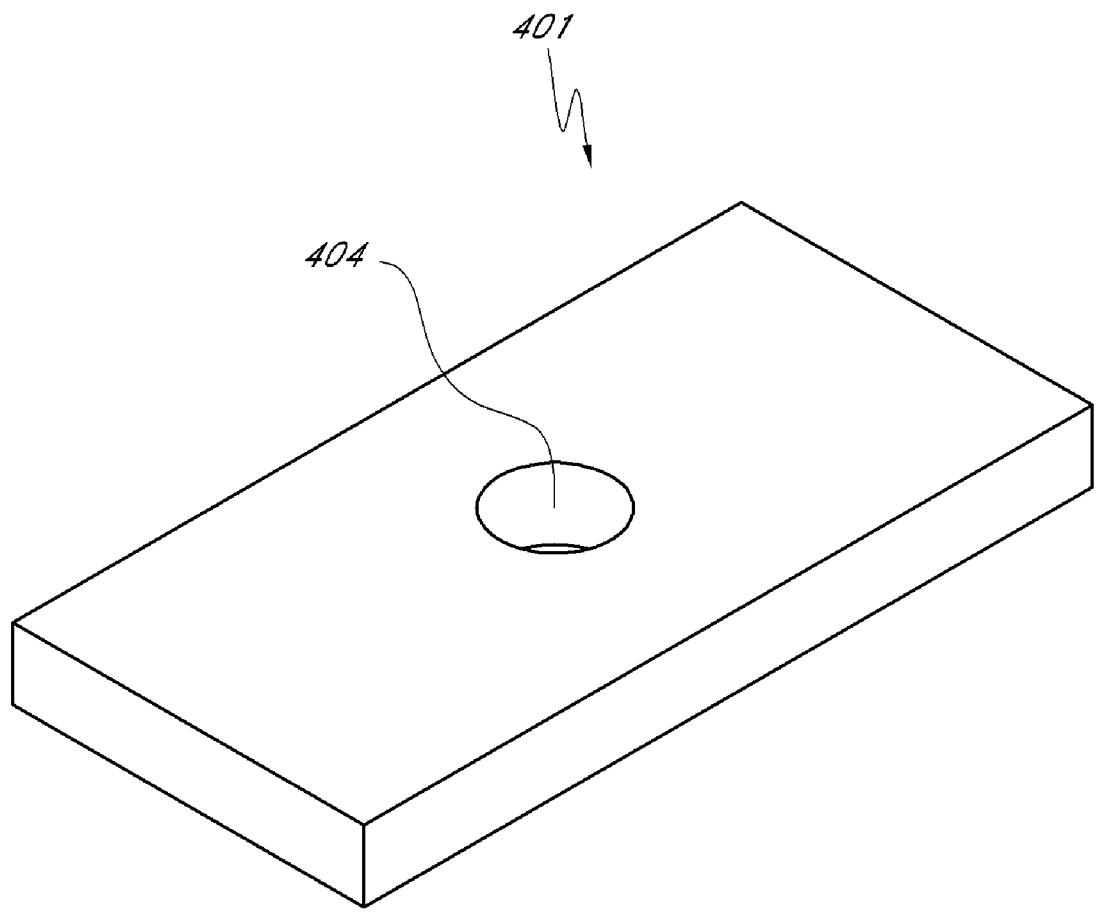
FIG. 5 is a top perspective view of a reinforcement plate of the hold down connector of FIG. 4.

FIG. 5 is a top perspective view of the reinforcement plate 401 in accordance with one embodiment. The reinforcement plate 401 has a hole 404 configured to receive an elongated tie member. The reinforcement plate can be made out of a variety of materials, although it is preferably made out of metal, steel, or other metal alloys.

Figure 6:
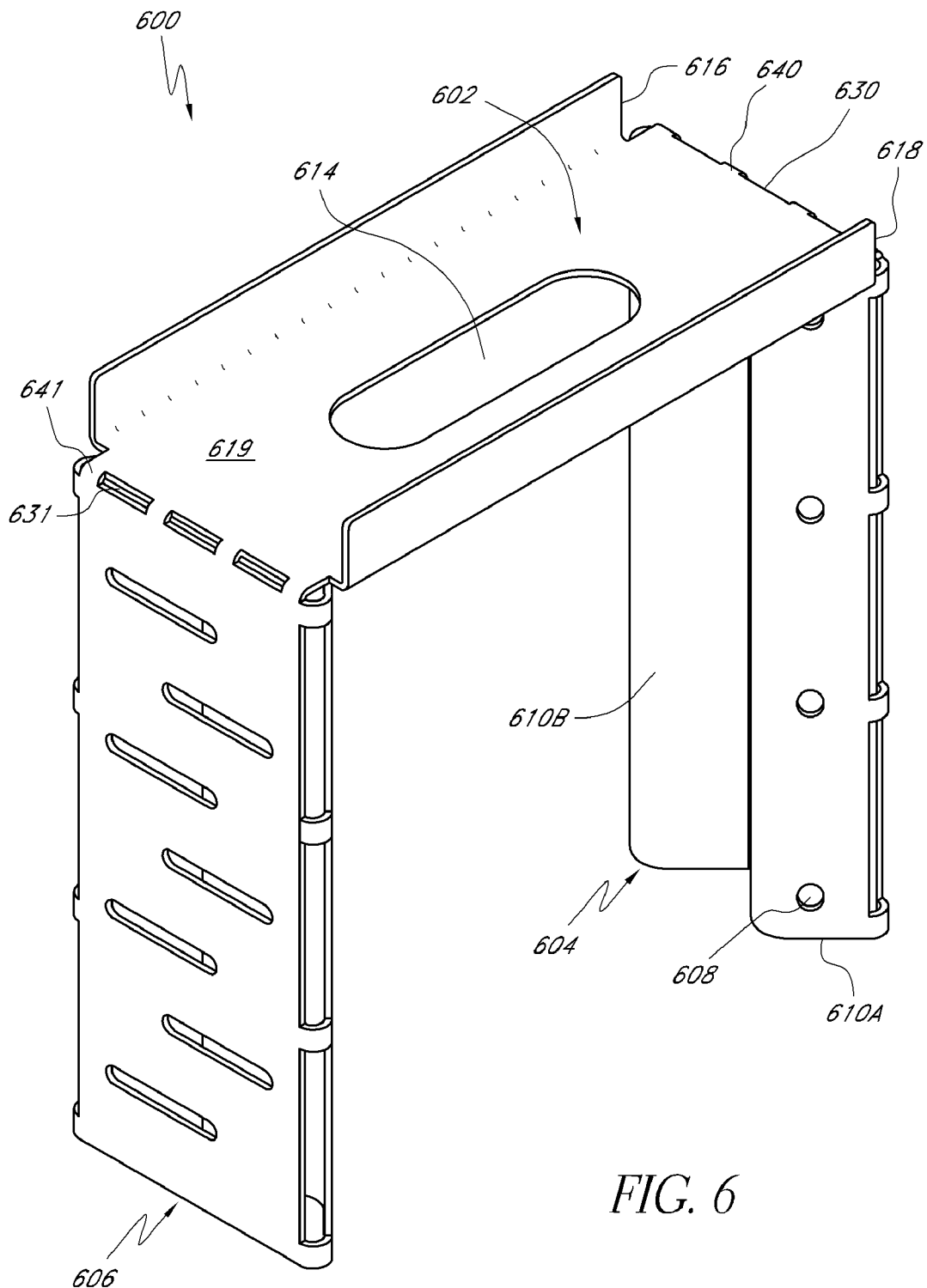
FIG. 6 is a top perspective view of a hold down connector in accordance with another embodiment.

FIG. 6 is a top perspective view of a hold down connector 600 in accordance with another embodiment. The hold down connector 600 has a transverse portion 602 connected to the top portions of a first leg 604 and a second leg 606. The first leg 604 and second leg 606 are preferably, but not necessarily, substantially identical. Each leg 604, 606 preferably includes one or more transverse extensions 610. In the illustrated embodiment, each leg 604, 606 includes a pair of transverse extensions 610A and 610B. Each transverse extension preferably has slots, openings, or holes 608 each capable of laterally receiving an elongated fastener. The holes 608 on transverse extensions 610A and 610B can be non-aligned or staggered relative to each other to avoid the fasteners from contacting each other when installed in an elongated building stud.

The hold down connector 600 preferably includes apertures 630 oriented in substantial alignment with an elongated connection or "bend" 640 between the transverse portion 602 and the first leg 604. Other embodiments can include apertures 630 without any particular orientation, such as circular holes. The hold down connector 600 also preferably has apertures 631 along, and preferably oriented in substantial alignment with, an elongated connection or "bend" 641 defined between the transverse portion 602 and second leg 606. The functionality and advantages of the apertures 630 and 631 are the same as for the apertures 130 and 131 of FIG. 1, which are described above.

The hold down connector 600 has a tie mounting opening or hole 614 that is elongated or slotted. The tie mounting opening is configured to receive an elongated tie member (see FIG. 17). The illustrated hole 614 is substantially parallel to a longitudinal axis of the transverse portion 602, however, in some embodiments the tie mounting hole 614 can be oriented in other directions (e.g., perpendicular to the longitudinal axis of the transverse portion 602). The slotted hole 614 can facilitate alignment and installation of the hold down connector 600 by allowing for lateral movement of the elongated tie member with respect to the hold down connector. The slotted hole 614 facilitates installation of the hold down connector 600 by accommodating a tie member that is not well aligned with respect to the tie mounting hole 614. It should be understood that the hole 614 can have a variety of other shapes (i.e., other than an elongated slot) or sizes to facilitate alignment. For example, the hole 614 can be an enlarged circle, relative to the size of the hole 114 shown in FIG. 1.

In some embodiments, the hold down connector 600 can also have vertical extensions 616 and 618. In some embodiments, the vertical extensions 616 and 618 can accommodate a reinforcement plate, slotted plate or other support plate to increase the structural support of the transverse portion 602 and load capacity of the hold down connector 600. The transverse portion 602 also has a main body portion 619.

Figure 7:
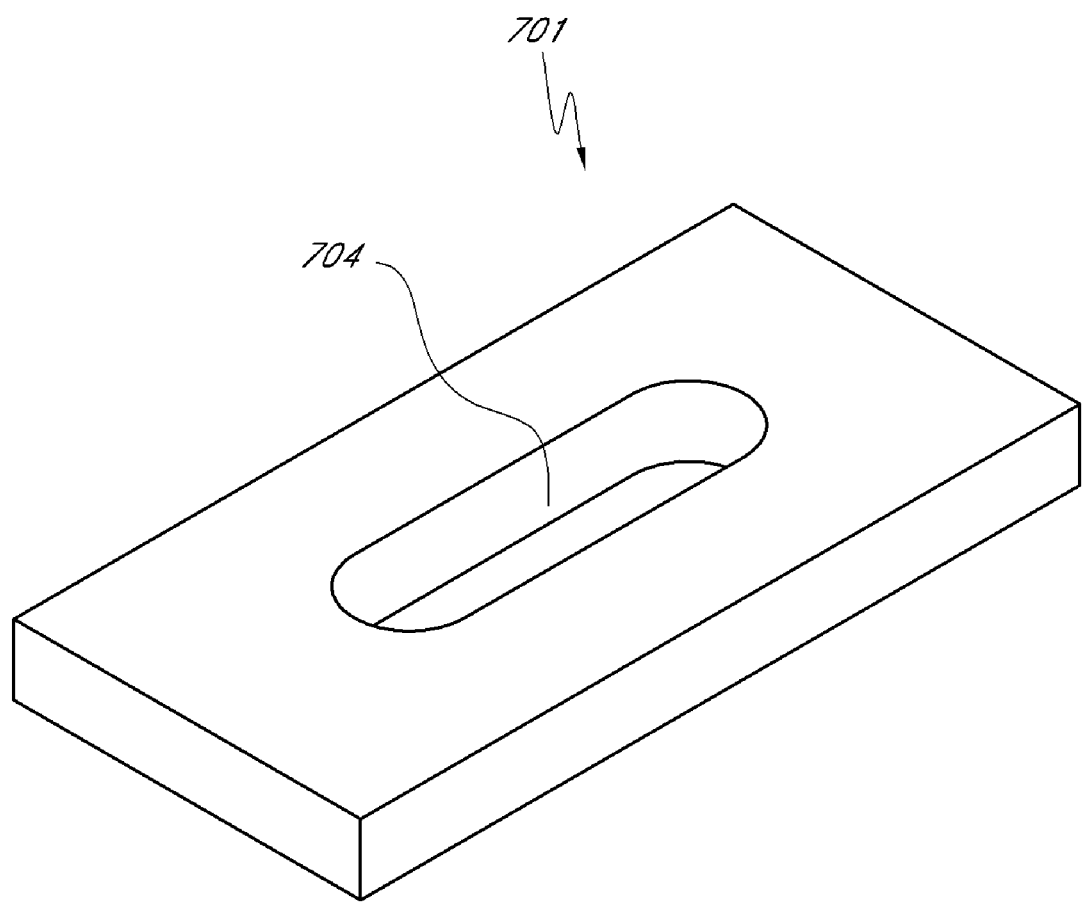
FIG. 7 is a top perspective view of a reinforcement plate configured for use with the hold down connector of FIG. 6.

FIG. 7 is a top perspective view of a reinforcement plate or washer 701 configured for use with the hold down connector 600 of FIG. 6. The plate or washer 701 has a slotted or elongated hole 704. The slotted hole is configured to receive an elongated tie member (see FIG. 17). The slotted hole can also be configured to align with the elongated hole 614 (FIG. 6). The slotted plate can provide additional support for the transverse portion 602 (FIG. 6). In some embodiments, the slotted plate 701 is configured to fit between the vertical extensions 616 and 618. In some embodiments, the slotted plate 701 is used with additional reinforcement plates (see FIGS. 13A, 13B, and 17).

Figure 8A:
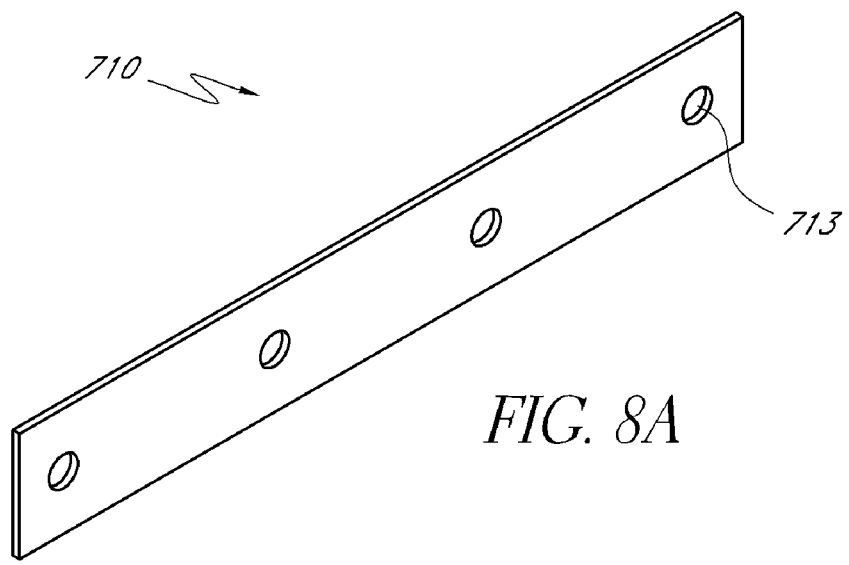
FIG. 8A is a top perspective view of a leg reinforcement plate of a hold down connector assembly, in accordance with one embodiment.
Figure 8B:
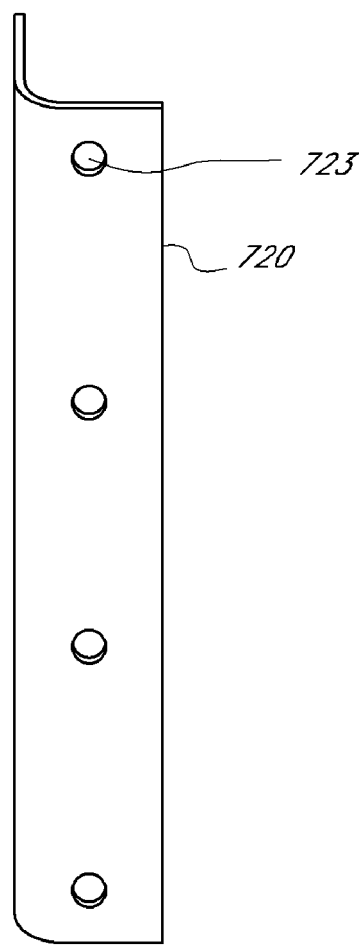
FIG. 8B is a top perspective view of a leg reinforcement plate of a hold down connector assembly, in accordance with another embodiment.

In some embodiments, the legs 104, 106 (FIG. 1) of the hold down connector 100 can be reinforced to provide additional support for the legs and transverse portion 102. FIGS. 8-10 illustrate different leg reinforcement plates that can be used, alone or in combination, to provide additional support for the legs 104, 106 and transverse portion 102 (it should be understood that the reinforcement plates are equally applicable to hold down connector 600 also). FIG. 8A illustrates a flat plate 710 with holes or openings 713. The holes or openings 713 are preferably configured to align with the holes 108 on the legs 104, 106. The fasteners 220 (FIG. 2) can extend laterally through the openings 713 of the flat plate 710 and the openings 108 on the legs 104, 106. In some embodiments a flat plate 710 is secured on the outer sides of the transverse extensions 110. In other embodiments a flat plate 710 is secured on the inner sides of the portions 208, 216. The additional reinforcement provided by the flat plate 710 increases the load bearing capacity of the hold down connector and can allow for construction out of thinner materials while still meeting building code requirements. In various embodiments, a single leg 104, 106 can be reinforced by more than one flat plate 710, by a flat plate 710 and an angled plate 720 (FIG. 8B), by a flat plate 710 and a leg shield 725 (FIG. 9) or multiple hole shield 730 (FIG. 10), which are now described.

FIG. 8B illustrates a leg reinforcement plate in accordance with another embodiment. The illustrated angled plate 720 is configured to engage the legs 104, 106 of the hold down connector 100 (see FIGS. 1 and 2). The angled plate 720 can be configured with openings or holes 723 capable of laterally receiving fasteners 220. In some embodiments the angled plate 720 is secured on the outer side of the transverse extension 110. In some embodiments, the angled plate 720 can be configured such that it conforms to the shape of the transverse extension 110A, 110B (see FIG. 2). For example, the angled plate 720 can be configured to be secured to portions 208, 209, 210, or to portions 216, 211, 218 of the leg 106. The plates 720 can be secured to the sides of transverse extensions 110A and 110B that face away from the leg's main body 136. Alternatively, the plates 720 can be secured to the sides that face toward the main body 136. In various embodiments, a single leg 104, 106 can be reinforced by more than one flat plate 710, by a flat plate 710 and an angled plate 720 (FIG. 8B), or by a flat plate 710 and a leg shield 725 (FIG. 9) or multiple hole shield 730 (FIG. 10). It will also be understood that the angled plate 720 is equally applicable to hold down connector 600 (FIG. 6).

Figure 9A:
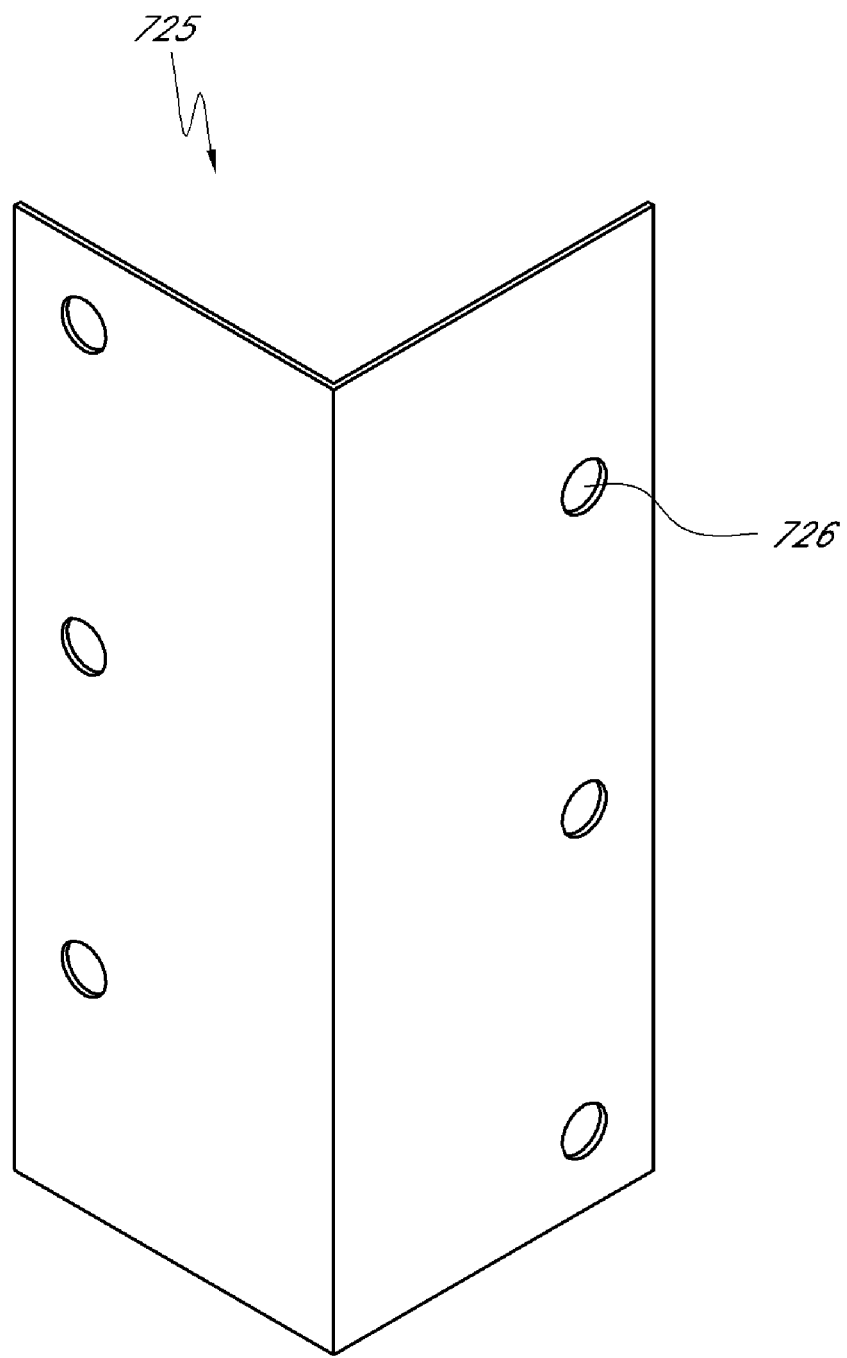
FIGS. 9A and 9B are top perspective and cross-sectional views, respectively of a leg reinforcement plate of a hold down connector assembly, in accordance with another embodiment.
Figure 9B:
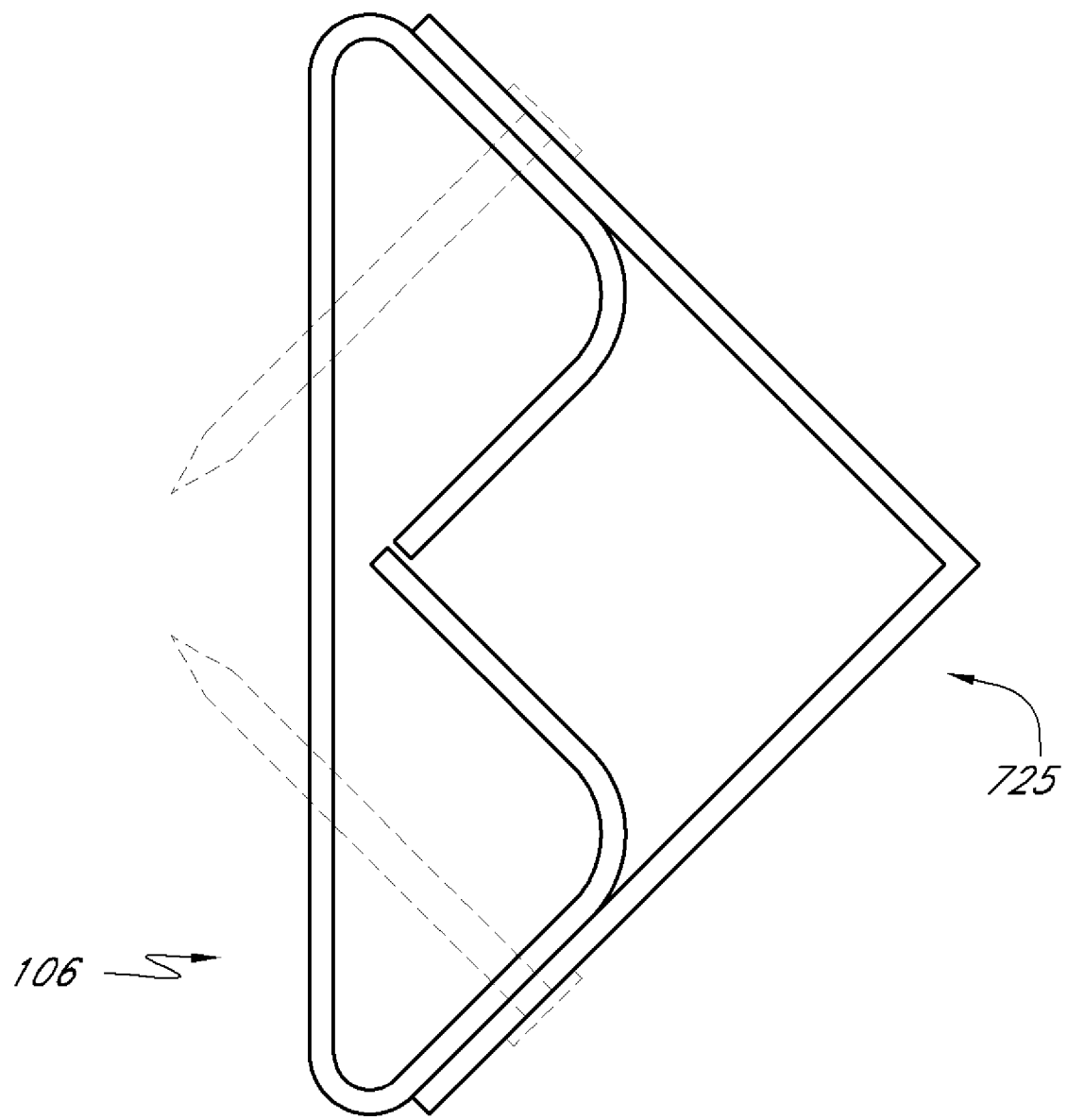

FIGS. 9A and 9B illustrate a top perspective and cross-sectional view of a leg reinforcement plate in accordance with another embodiment. The illustrated leg shield 725 can be configured to engage the legs 104, 106 or transverse extensions 110 of the hold down connector (see FIGS. 1 and 2). The leg shield 725 can be configured with openings or holes 726 capable of laterally receiving fasteners 220. FIG. 10B illustrates a leg shield 725 secured to a leg 106, similar to FIG. 2. The illustrated leg shield 725 is configured to be secured to two transverse extensions 110A, 110B. In some embodiments, the openings in the leg shield 726 are configured to align with the openings or holes 108 on the legs 104, 106 of the hold down connector 100. In various embodiments, a single leg 104, 106 can be reinforced by more than one flat plate 710, by a flat plate 710 and an angled plate 720 (FIG. 8B), or by a flat plate 710 and a leg shield 725 or multiple hole shield 730 (FIG. 10). It will also be understood that the leg shield 725 is equally applicable to hold down connector 600 (FIG. 6).

Figure 9C:
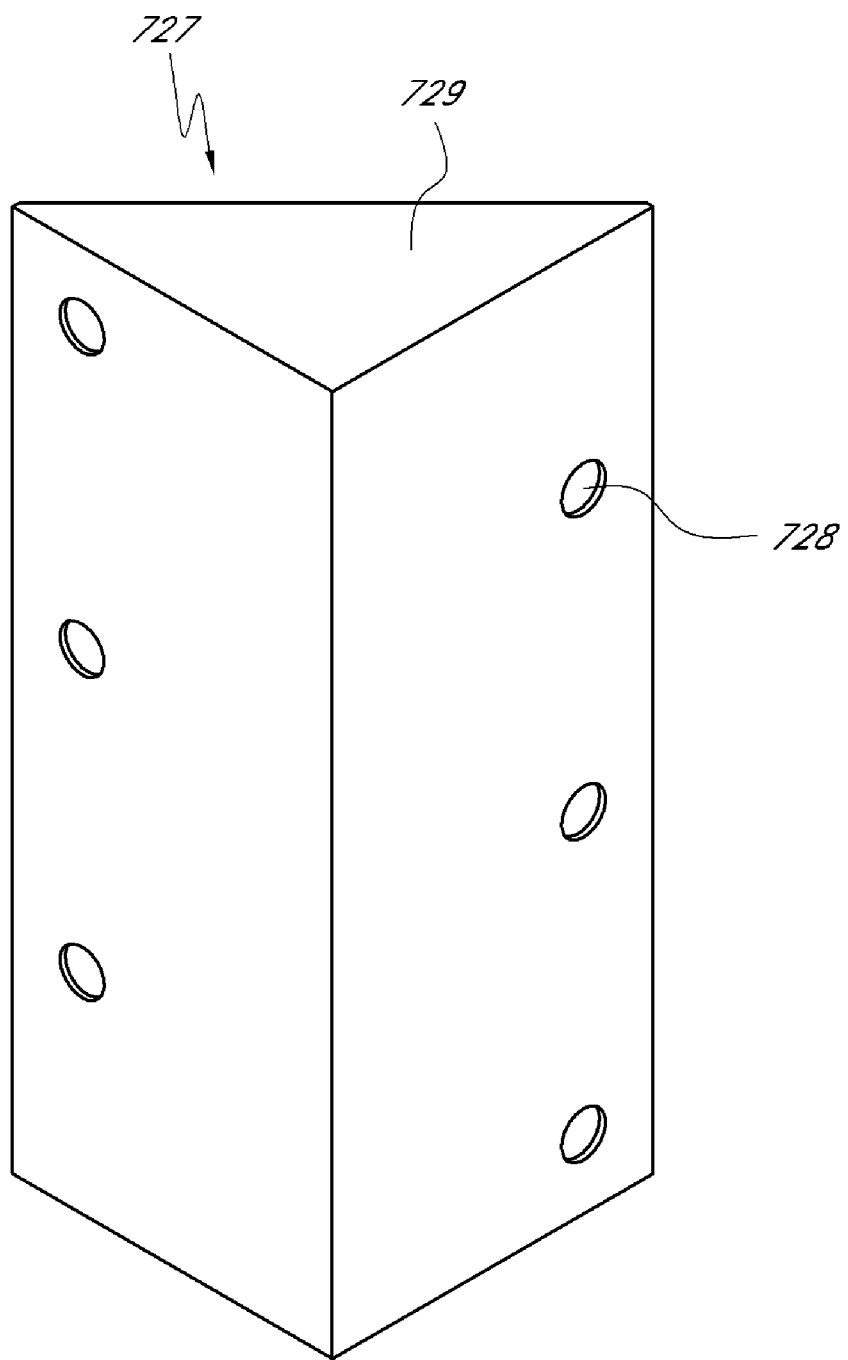
FIG. 9C is a top perspective view of a leg reinforcement plate of a hold down connector assembly, in accordance with another embodiment.

FIG. 9C illustrates a leg shield 727 similar to the leg shield 725 of FIG. 9A, but with a top plate 729. The top plate 729 can be configured to fit between the main body 119 of the transverse portion 102 and the top end of the transverse extensions 110 (see FIG. 1). The top plate 729 can facilitate installation and increase rigidity because it provides an additional area of engagement with the hold down connector 100 in addition to the holes 728 configured to laterally receive fasteners 220. The top plate 729 can engage with the hold down connector and secure it in place, thereby making it easier to drive the fasteners 220 through the holes 728 in the leg shield 727 and the holes 108 in the legs 104, 106. The additional area of contact between the top plate 727 and the hold down connector 100 can also provide additional support to the transverse portion 102. In various embodiments, a single leg 104, 106 can be reinforced by more than one flat plate 710, by a flat plate 710 and an angled plate 720 (FIG. 8B), or by a flat plate 710 and a leg shield 727 or multiple hole shield 731 (FIG. 10C). It will also be understood that the leg shield 727 is equally applicable to hold down connector 600 (FIG. 6).

In other embodiments, the leg shield 725, 727 can have a bottom portion that engages or touches the transverse extensions 110 at the bottom of the leg 104, 106.

Figure 10A:
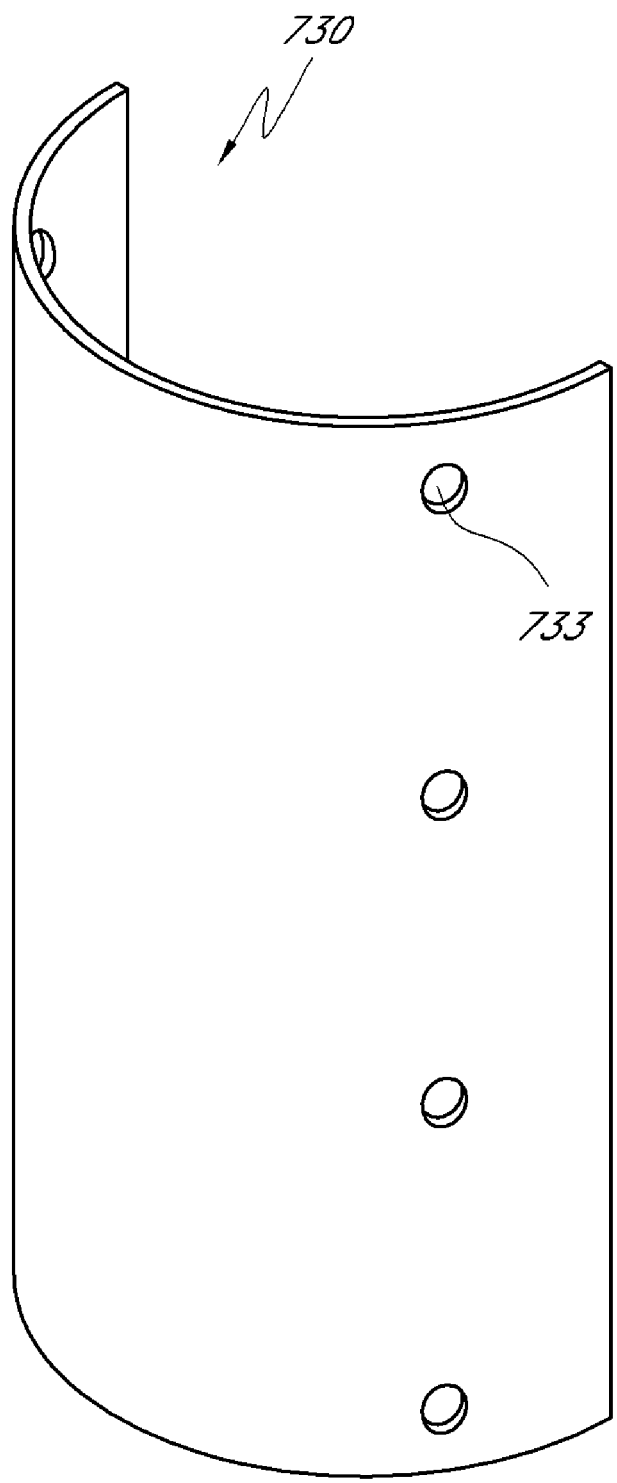
FIGS. 10A and 10B are top perspective and cross-sectional views, respectively, of a leg reinforcement plate of a hold down connector assembly, in accordance with another embodiment.
Figure 10B:
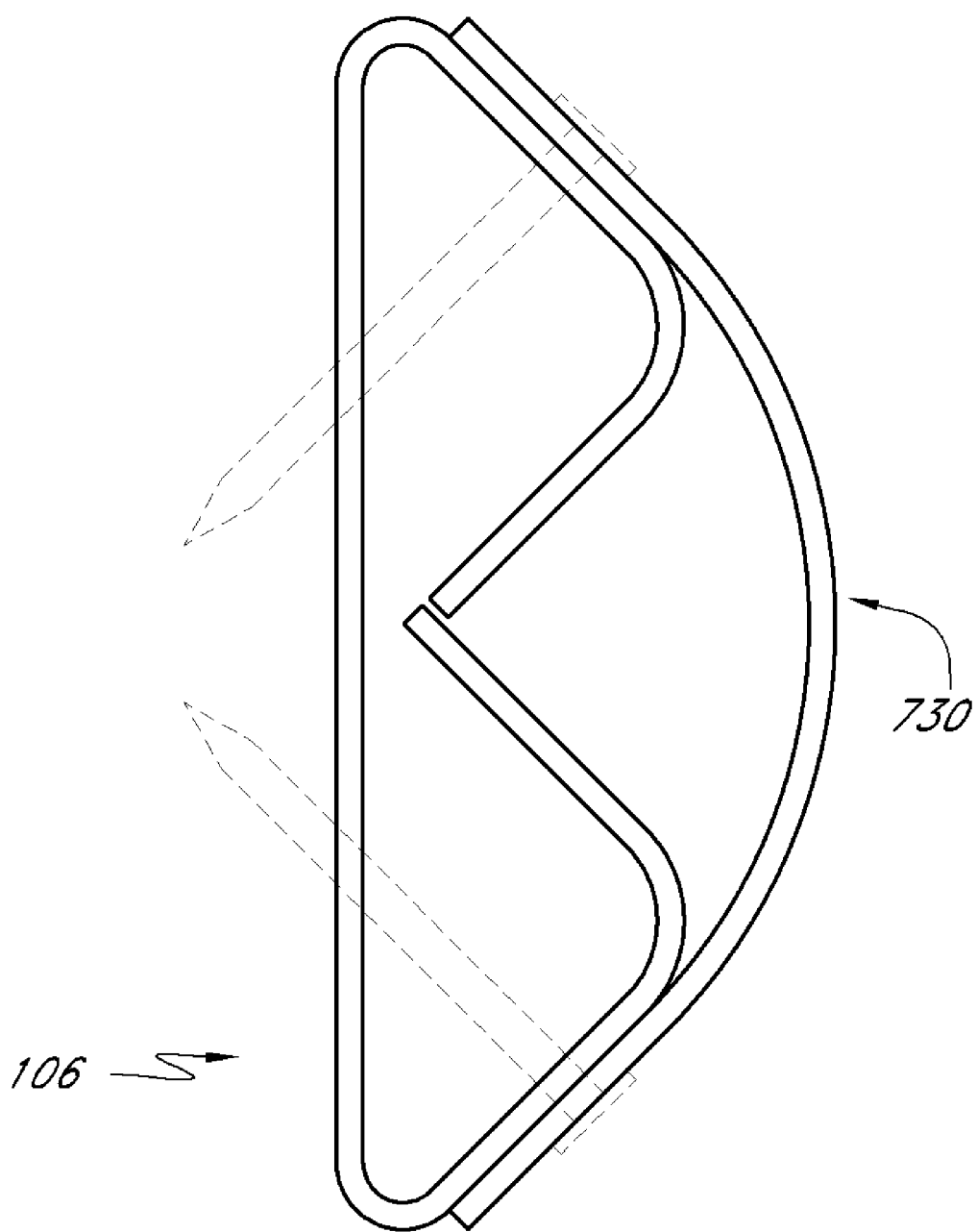
Figure 10C:
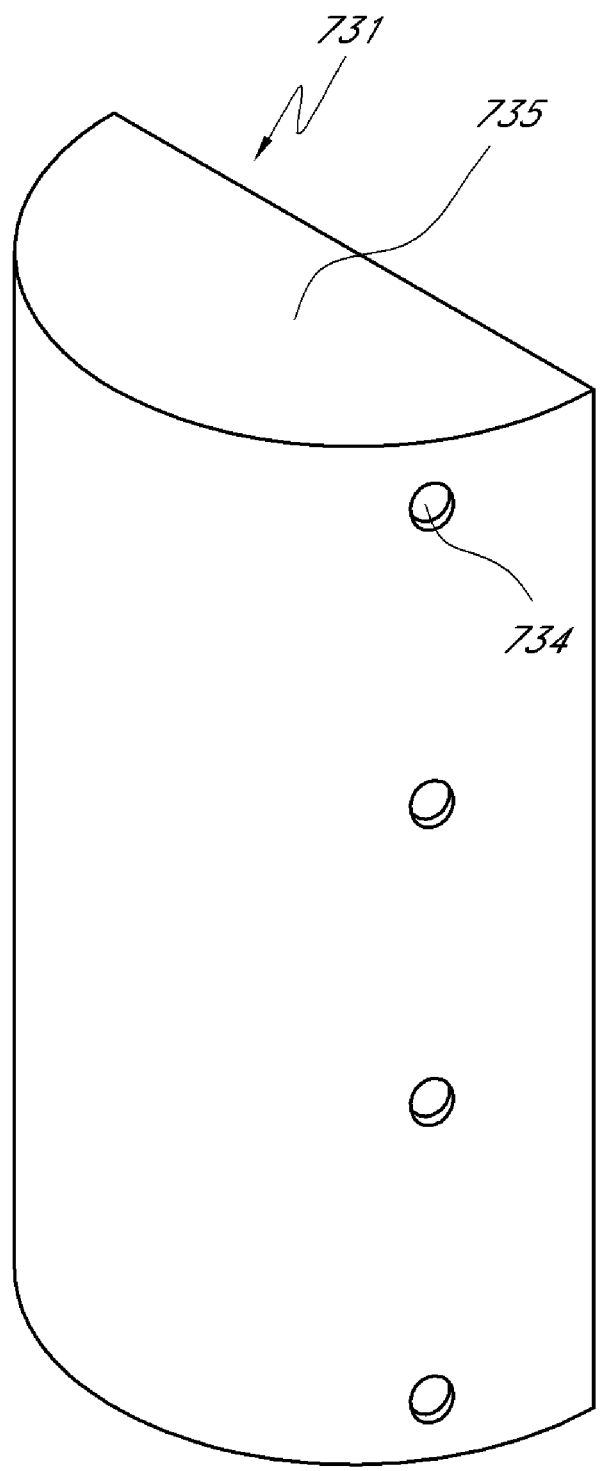
FIG. 10C is a top perspective view of a leg reinforcement plate of a hold down connector assembly, in accordance with another embodiment.

FIGS. 10A and 10B illustrate a top perspective and cross-sectional view of a leg reinforcement plate in accordance with another embodiment. The illustrated multiple hole shield 730 can be configured to engage the legs 104, 106 or transverse extensions 110 of the hold down connector (see FIGS. 1 and 2). The multiple hole shield 730 can be configured with openings or holes 733 capable of laterally receiving fasteners 220. FIG. 10B illustrates a multiple hole shield secured to a leg 106, similar to FIG. 2. The illustrated multiple hole shield 730 is configured to be secured to two transverse extensions 110A, 110B. In some embodiments, the openings in the multiple hole shield 720 are configured to align with the openings or holes 108 on the legs 104, 106 of the hold down connector 100. In various embodiments, a single leg 104, 106 can be reinforced by more than one flat plate 710, by a flat plate 710 and an angled plate 720 (FIG. 8B), or by a flat plate 710 and a leg shield 725 (FIG. 9) or multiple hole shield 730 (FIG. 10).

It will also be understood that the multiple hole shield 730 is equally applicable to hold down connector 600 (FIG. 6).

FIG. 10C illustrates a multiple hole shield 731 similar to the multiple hole shield 730 of FIG. 10A, but with a top plate 735. The top plate 735 can be configured to fit between the main body 119 of the transverse portion 102 and the top end of the transverse extensions 110 (see FIG. 1). The top plate 735 can facilitate installation because it provides an additional area of engagement with the hold down connector 100 in addition to the holes 734 configured to laterally receive fasteners 220. The top plate can engage with the hold down connector and secure it in place, thereby making it easier to drive the fasteners 220 through the holes 734 in the multiple hole shield 731 and the holes 108 in the legs 104, 106. The additional area of contact between the top plate 735 and the hold down connector 100 can also provide additional support to the transverse portion 102. In various embodiments, a single leg 104, 106 can be reinforced by more than one flat plate 710, by a flat plate 710 and an angled plate 720 (FIG. 8B), or by a flat plate 710 and a leg shield 725 (FIG. 9) or multiple hole shield 731 (FIG. 10C). It will also be understood that the multiple hole shield 731 is equally applicable to hold down connector 600 (FIG. 6).

In other embodiments, the multiple hole shield can have a bottom portion that engages or touches the transverse extensions 110 at the bottom of the leg 104, 106.

Figure 11:
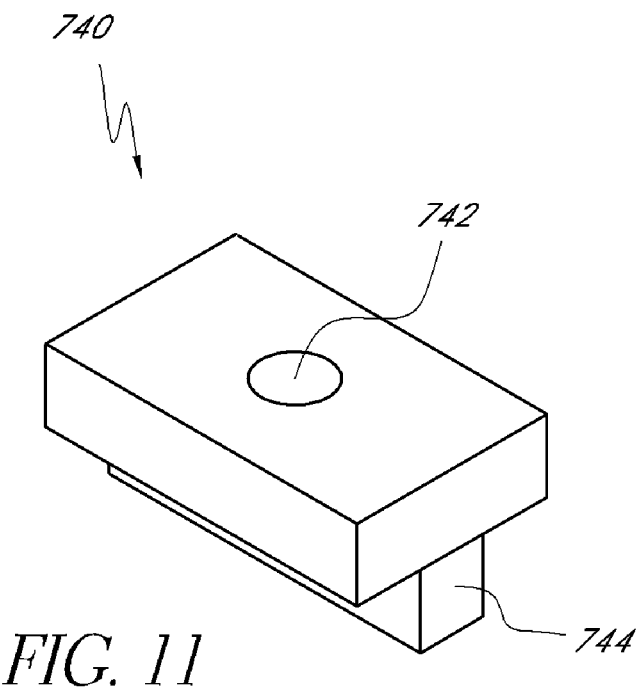
FIG. 11 is a top perspective view of a T-washer of a hold down connector assembly in accordance with one embodiment.
Figure 12:
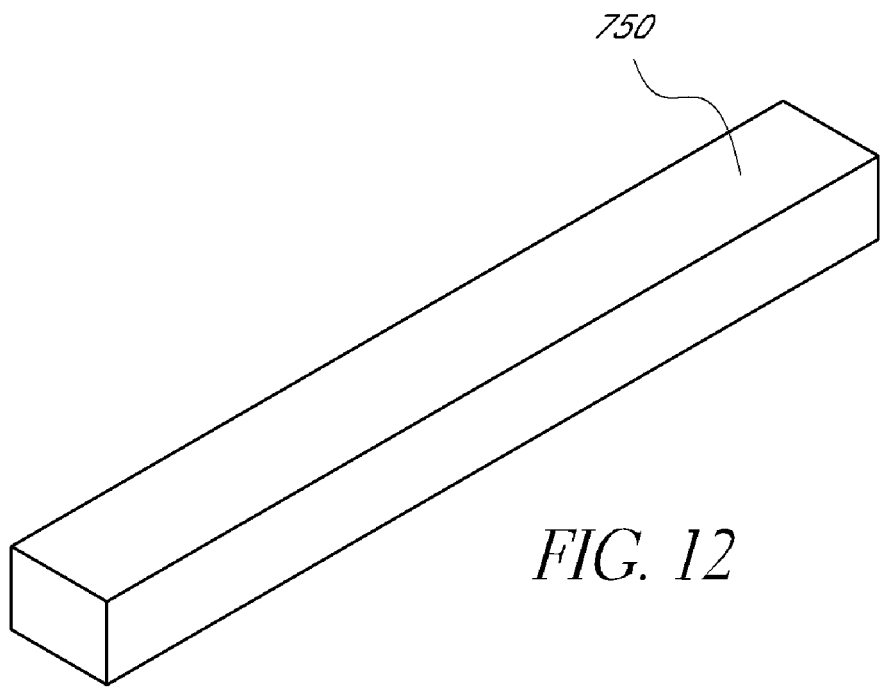
FIG. 12 is a top perspective view of an embodiment of a support block used in conjunction with the T-washer of FIG. 11.

FIGS. 11-13 illustrate various portions of hold down connector assemblies in accordance with some embodiments. FIG. 11 illustrates a T-washer 740, in accordance with one embodiment. The T-washer 740 can include a hole or opening 742 capable of receiving an elongated tie member. The illustrated T-washer 740 has a T-shaped vertical cross section along its length. In some embodiments, the lower portion 744 of the T-washer 740 is configured to fit in the slotted hole 704 of the slotted plate 701 (FIG. 7).

FIG. 12 illustrates a support block 750 in accordance with an embodiment. The support block 750 can be used to provide additional reinforcement to the transverse portion of the hold down connector and hold down connector assembly. The illustrated support block 750 has a rectangular cross section and extends lengthwise. In some embodiments, the support block 750 can have a square cross section. In some embodiments, one or more support blocks 750 can be used to provide reinforcement to the hold down connector, for example see FIG. 17. The support blocks can be used alone or in combination with other support members. In some embodiments the support blocks 750 can be secured to the transverse portion 102, 602. For example, the support blocks 750 can be secured to the transverse portion by welding, by engaging with the upward extensions 116, 118, 616, 618 bearing on the support blocks, etc.

Figure 13A:
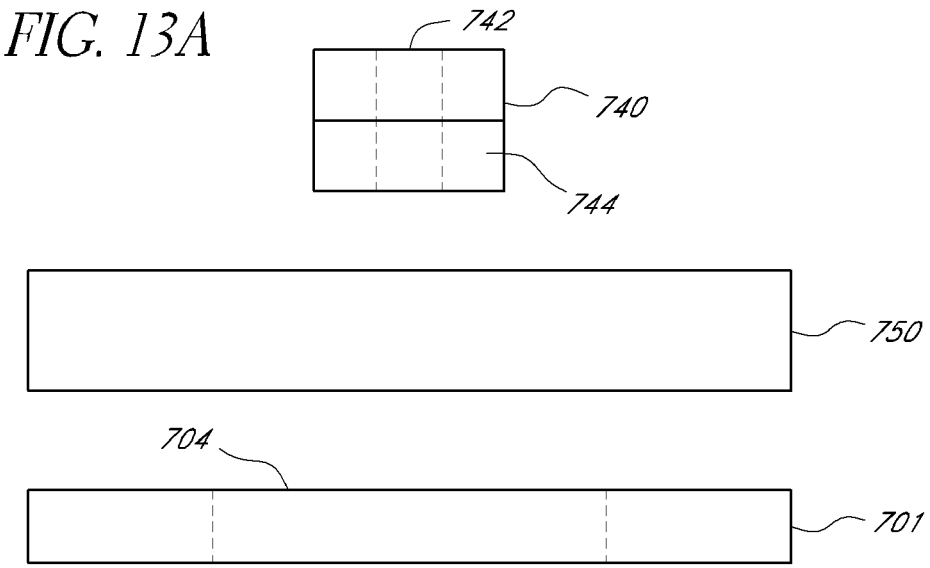
FIGS. 13A and 13B are side and cross-sectional views of a portion of a hold down connector assembly employing the elements of FIGS. 11 and 12, in accordance with one embodiment.
Figure 13B:
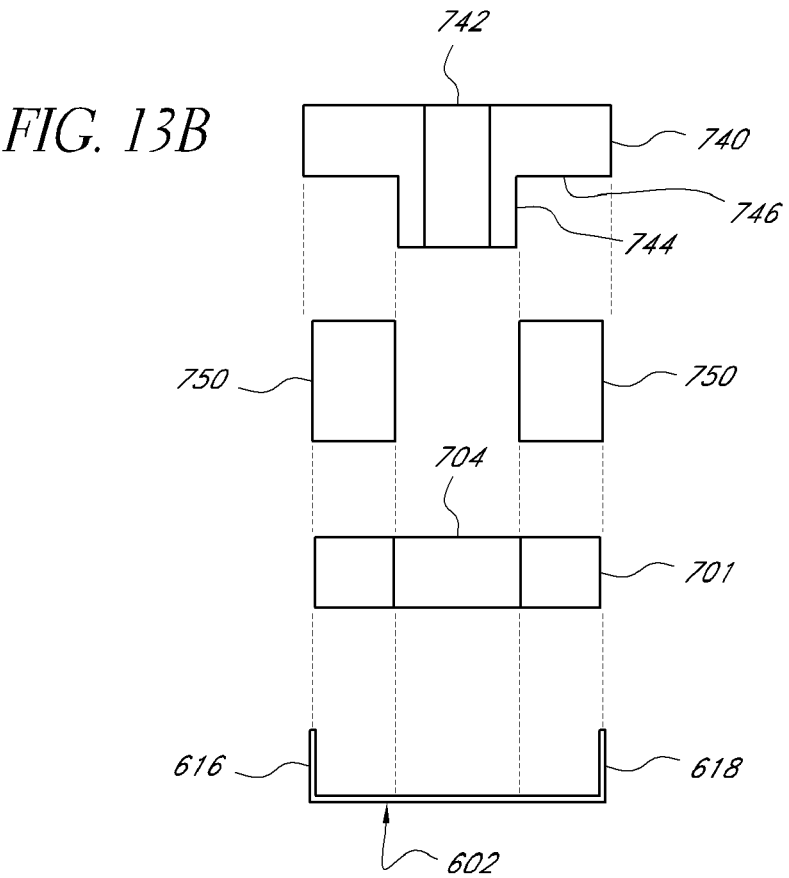

FIGS. 13A and 13B are a front view and a cross-sectional side view, respectively, of an upper portion of a hold down connector assembly in accordance with one embodiment. FIG. 13A is a front view illustrating a support configuration in accordance with one embodiment. In some embodiments, the hold down connector assembly comprises a T-washer 740 (FIG. 11), a pair of support blocks 750 (FIG. 12), and a slotted plate 701 (FIG. 7). The T-washer 740, support blocks 750, and slotted plate 701 can be configured to fit between the upward extensions 116, 118 (FIG. 1) and 616, 618 (FIG. 6) to provide additional reinforcement to the transverse portion 102, 602 (FIGS. 1 and 6). Although described in relation to the hold down connector 600 shown in FIG. 6, those skilled in the art will understand that the elements shown in FIGS. 13A and 13B may be provided in other embodiments of hold down connectors, including the hold down connector 100 of FIG. 1.

The dotted lines in FIG. 13A illustrate the opening 742 in the T-washer 740 that can be configured to receive an elongated tie member. The slotted opening 704 in the slotted plate 700 is also illustrated with dashed lines.

FIG. 13B is a cross-sectional side view of the hold down connector assembly of FIG. 13A. In some embodiments, the T-washer 740 engages with the transverse portion 602 by fitting, preferably snugly, between the vertical extensions 616 and 618 and transverse portion 602. In some embodiments, and as illustrated in FIGS. 13A and 13B, the support blocks 750 are interposed between the plate 701 and the surfaces 746 of the T-washer 740, at opposing sides of the lower portion 744. In certain of these embodiments, the lower portion 744 extends into the slot 704 of the plate 701 when the T-washer rests on the support blocks 750. In other embodiments, the lower portion 744 does not extend into the slot 704 when the T-washer rests upon the support blocks 750. In other embodiments the support blocks 750 are omitted and the lower portion 744 of the T-washer 740 inserts into the slot 704 of the slotted plate 701, with the surfaces 746 preferably resting directly on the plate 701.

Figure 14:
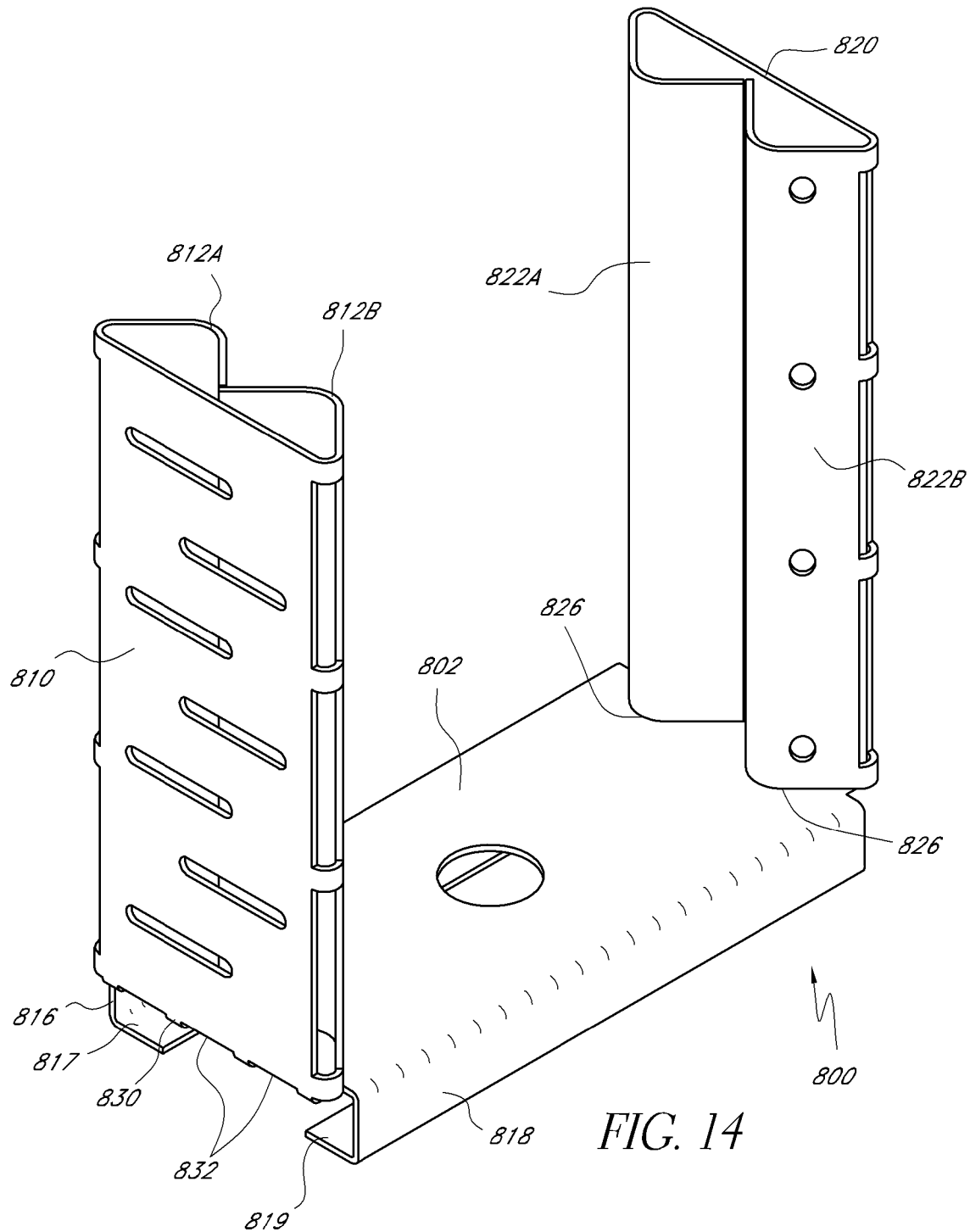
FIG. 14 is a top perspective view of a hold down connector in accordance with another embodiment.

In some embodiments the slotted plate 701 can be omitted. For example, the hold down connector assembly can comprise a T-washer 740 and a pair of support blocks 750. The support blocks 750 and T-washer 740 can be configured to fit between the upward extensions 116, 118 (FIG. 1); 616, 618 (FIG. 6); 816, 818 (FIG. 14) to provide additional reinforcement to the transverse portion 102, 602, 802 (FIGS. 1, 6, and 14).

In some embodiments the T-washer 740 can be omitted. For example, the support blocks can be secured to the transverse portion 602 and a cinch nut can bear against the support blocks and engage with the tie member.

Figure 17:
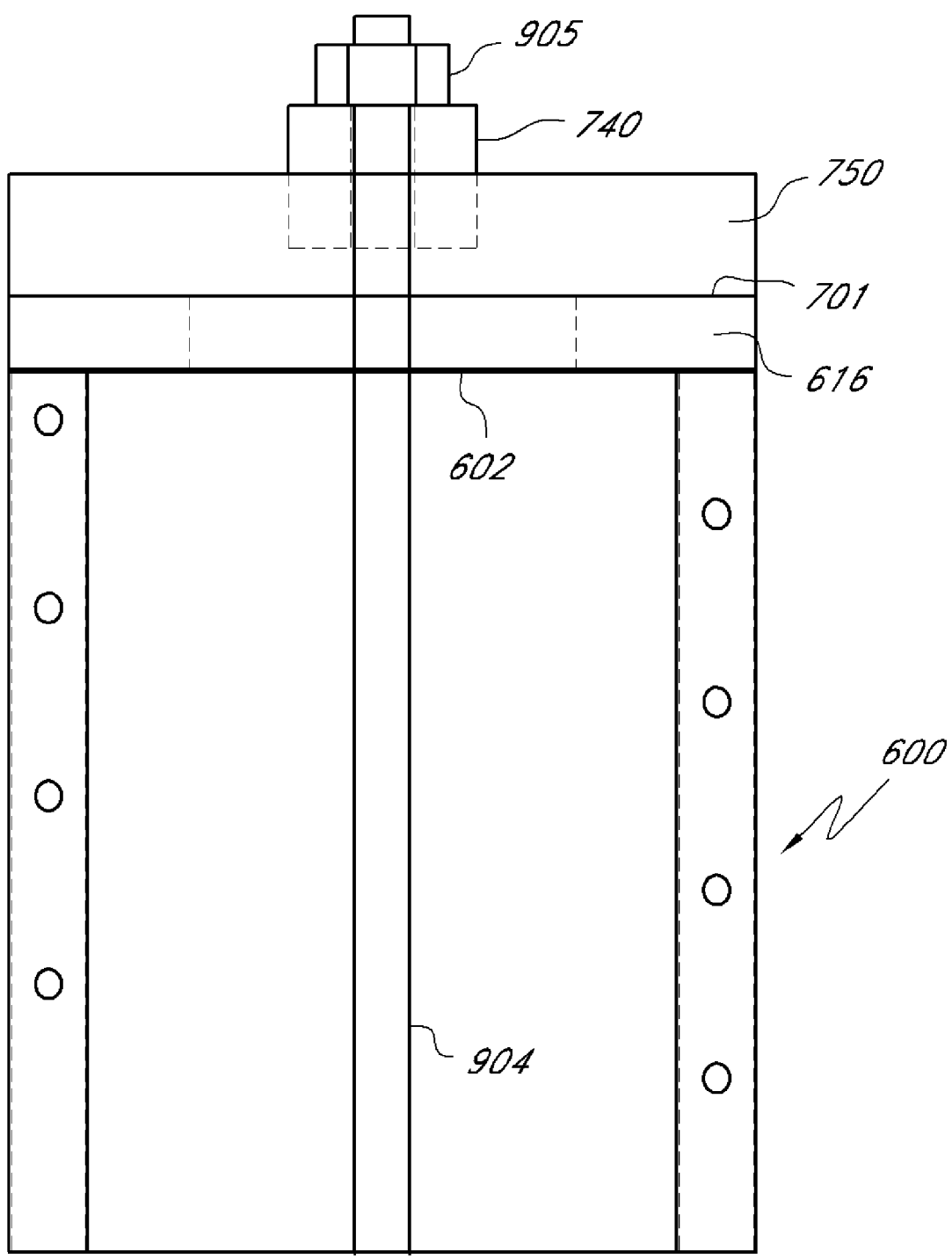
FIG. 17 is a front view of a hold down connector and elongated tie member in accordance with one embodiment.

In some embodiments, the vertical extensions 616 and 618 extend upwardly far enough to engage with the support blocks 750 and possibly the T-washer 740 supported thereon. In some embodiments, the configuration illustrated in FIGS. 13A and 13B engages with an elongated tie member extending through openings 742, 704, and 614 (FIG. 6). The elongated tie member can be secured to the T-washer 740 with a nut or a take-up device such as a cinch nut. A take-up device, as used herein, is a device that compensates over time for the shrinkage of building components, by moving along a tie-member. For example, a cinch nut can comprise multiple nut segments that expand and contract to move along a threaded rod. A suitable cinch nut or take-up device is disclosed in U.S. Patent Application Publication No. 2007-0014630 A1. FIG. 17, as discussed in greater detail below, illustrates the T-washer 740, support blocks 750, and slotted plate 701 engaged with a hold down connector, elongated tie member, and nut in accordance with one embodiment.

In some embodiments, one or more of the support items can be omitted. For example, the T-washer 740 and support blocks 750 can be omitted such that the nut engages with the slotted plate 701. In other embodiments, the support blocks can be omitted such that the T-washer 740 engages with the slotted plate 701, elongated tie member, and nut. In some embodiments the length of the T-washer can be as long as the slotted hole 704 illustrated in FIG. 13A.

The embodiments illustrated in FIGS. 13A, 13B, and 17 can provide the hold down connector with additional support. The multi-piece configurations can offer cost savings over a thick reinforcement plate 401 illustrated in FIG. 4. In some embodiments, a larger reinforcement plate 401 is costly to machine and produce. The support blocks 750, T-washer 740, and slotted washer 701 can be appreciably smaller and can be manufactured less expensively than larger reinforcement plates.

FIG. 14 is a top perspective view of a hold down connector 800 in accordance with another embodiment. The illustrated hold down connector 800 has a transverse portion 802, a first leg 810 and a second leg 820. The first leg 810 and second leg 820 are preferably substantially parallel. The first leg 810 has transverse extensions 812A and 812B that extend towards the second leg 820. Likewise, the second leg 820 has transverse extensions 822A and 822B that extend toward the first leg 810. Lower ends 826 of the transverse extensions 822A, 822B, 812A, and 812B preferably contact and support the transverse portion 802 when an associated tie member is in compression. This helps to prevent the transverse portion 802 from shearing away from the legs 810, 820. The transverse portion 802 has vertical extensions 816 and 818. In some embodiments, the vertical extensions 816, 818 have second portions 817, 819 that extend towards the opposing vertical extensions. The vertical extensions 816, 817 and 818, 819 can be configured to engage with a support plate 401, 701, support blocks 750, or a combination of support plates and support blocks. The vertical extensions can hold the support plates or blocks in place against the transverse portion. In some embodiments, the vertical extensions can be omitted. The transverse portion 802 is preferably connected to the first leg 810 and second leg 820 at elongated connections or bends 830, which preferably include apertures 832. As explained above with respect to the apertures 130 and 131 shown in FIG. 1, the apertures 832 can have a variety of shapes (e.g., circular, ovular, elongated), which facilitate sharper bends, and allow for the use of thicker materials. In some embodiments, the first and second legs 810, 820 can be secured to the transverse portion 802 by welding or other means. In some embodiments, the legs 810, 820 can be secured to the transverse portion 802 along the elongated connections 830. In some embodiments, the legs 810, 820 can also be secured to the transverse portion 802 along the lower ends 826 of the transverse extensions 812 and 822 by welding or other means.

The hold down connector 800 illustrated in FIG. 14 is configured such that transverse portion 802 is below the transverse extensions 812A, 812B, 822A, 822B. The transverse extensions 812A, 812B, 822A, 822B provide additional support for the transverse portion 802 when the hold down connector is connected to an elongated tie member in compression. The hold down connectors 100, 600 (FIGS. 1 and 6) are configured with the transverse portion 102, 602 located above the transverse extensions 110A, 110B, 610A, 610B. The transverse extensions 110A, 110B, 610A, 610B thereby provide additional support to the transverse extension 102, 602 when an elongated tie member is connected in tension to the hold down connector 100, 600. The location of the transverse portion 102, 602 of the hold down connectors 100, 600 increases the tension load bearing capacity of the connector. The higher capacity hold down connectors 100, 600 are suitable for applications, such as connecting elongated building studs that are further apart (e.g., more than 3" in spacing) and bridge configurations spanning multiple floors.

The additional support from the transverse extensions allows the hold down connector to support significantly larger loads. In contrast, the transverse portion 802 of the hold down connector 800 is located below the transverse extensions 812A, 812B, 822A and 822B. When the hold down connector 800 is connected to an elongated tie member in tension the transverse extensions 812A, 812B, 822A and 822B do not provide any support or only minimal support if they are attached or welded to the transverse portion 802.

FIG. 15 is a top perspective view of a hold down connector assembly installed between substantially parallel building studs in accordance with one embodiment. The illustrated assembly includes the hold down connector 100 of FIGS. 1-3. The hold down connector 100 is installed between vertical building studs 902 and 903. The hold down connector 100 is configured to receive an elongated tie member 904. The tie member 904 can be configured to engage with a nut 905, or other bearing member. The nut 905 can bear against the hold down connector 100 or reinforcement plate 401 (FIG. 4). Alternatively, the assembly shown in FIGS. 13A and 13B can be provided. In the illustrated assembly, the tie member 904 extends through a bottom plate or base plate 906. The tie member 904 further extends into a foundation 908. In some embodiments, the tie member 904 is embedded in the foundation 908 and may include a bent end 907 in the foundation to provide additional anchoring. For clarity of presentation, the fasteners (e.g., 220, FIG. 2) and reinforcement plate 401 (FIG. 4) are not shown in FIG. 7. For simplicity, the assembly is shown with the bottom plate 906 aligned with a side of the foundation 908. However, the bottom plate 906 and hold down connector assembly can be positioned anywhere on the foundation 908. The hold down connector 100 can be positioned at any vertical position between the studs 902 and 903, such as near an end of the studs or closer to the middle of the length of the studs. The elongated tie member 904 can comprise a cylindrical rod with a structure for engaging with the hold down connector 100, such as threads and a nut 905 engaged with threads and bearing against the transverse portion 102 (FIG. 1) or support plate 401 (FIG. 4).

While the tie member 904 of the assembly of FIG. 7 is connected to a foundation 908, it should be appreciated that other embodiments can involve assemblies in which the tie member 904 is not connected to a foundation. For example, the tie member 904 can be connected to a hold down connector and to any non-foundation structure. In one embodiment, the tie member 904 is connected to two or more hold downs. In some embodiments, the tie member 904 is connected to a foundation 908 and also to multiple hold downs.

In accordance with another aspect of the invention, methods are provided herein for securing together multiple building members.

In some embodiments, a single story configuration can be used, as shown in FIG. 15, where the tie member 904 is anchored to a foundation 908 and a hold down connector 100 on the same floor in the building. In some embodiments, the tie member 904 can be connected to a foundation 908 at one end and connected to a hold down connector one or more floors above the foundation 908 on the other end. For example, a two level installation can include a tie member anchored to a foundation at one end with the other end of the tie member anchored to a hold down connector fastened between vertical building studs one floor above where the tie member is anchored to the foundation. In some embodiments, both ends of a tie member are secured to a hold down connector, with no part of the tie member being anchored to a foundation.

In some embodiments, the tie member includes multiple tie members attached together with a rod coupler or similar device. In some embodiments, the tie member can span more than two floors. In some embodiments the tie member can span the entire height of the building.

In some embodiments, the hold down connector can be connected to two vertical building studs and one end of a tie member wherein the opposing end of the tie member is connected to a foundation two or more floors below the hold down connector. In embodiments where the tie member spans two or more floors, the tie member can further be secured to each floor between the foundation and the hold down connector. For example, a cinch nut and washer can be used to secure the tie member to the intervening floors. The cinch nut ensures consistent contact with the floor as it bears down on the floor if any of the structural building members shrink or move relative to each other. In some embodiments, the tie member can be connected to a foundation and a hold down connector secured to a part of the building, such as a floor or ceiling, on the top floor of the building.

The hold down connectors of embodiments of the present invention can be installed as part of a shear wall assembly. In some embodiments, the shear wall assembly includes a hold down connector sandwiched between two vertical studs, which are connected to a sheet of plywood or other rectangular sheet. In other embodiments, there can be two pairs of hold down connectors sandwiched between vertical studs that are both attached to a sheet of plywood or other rectangular sheet.

Figure 16:
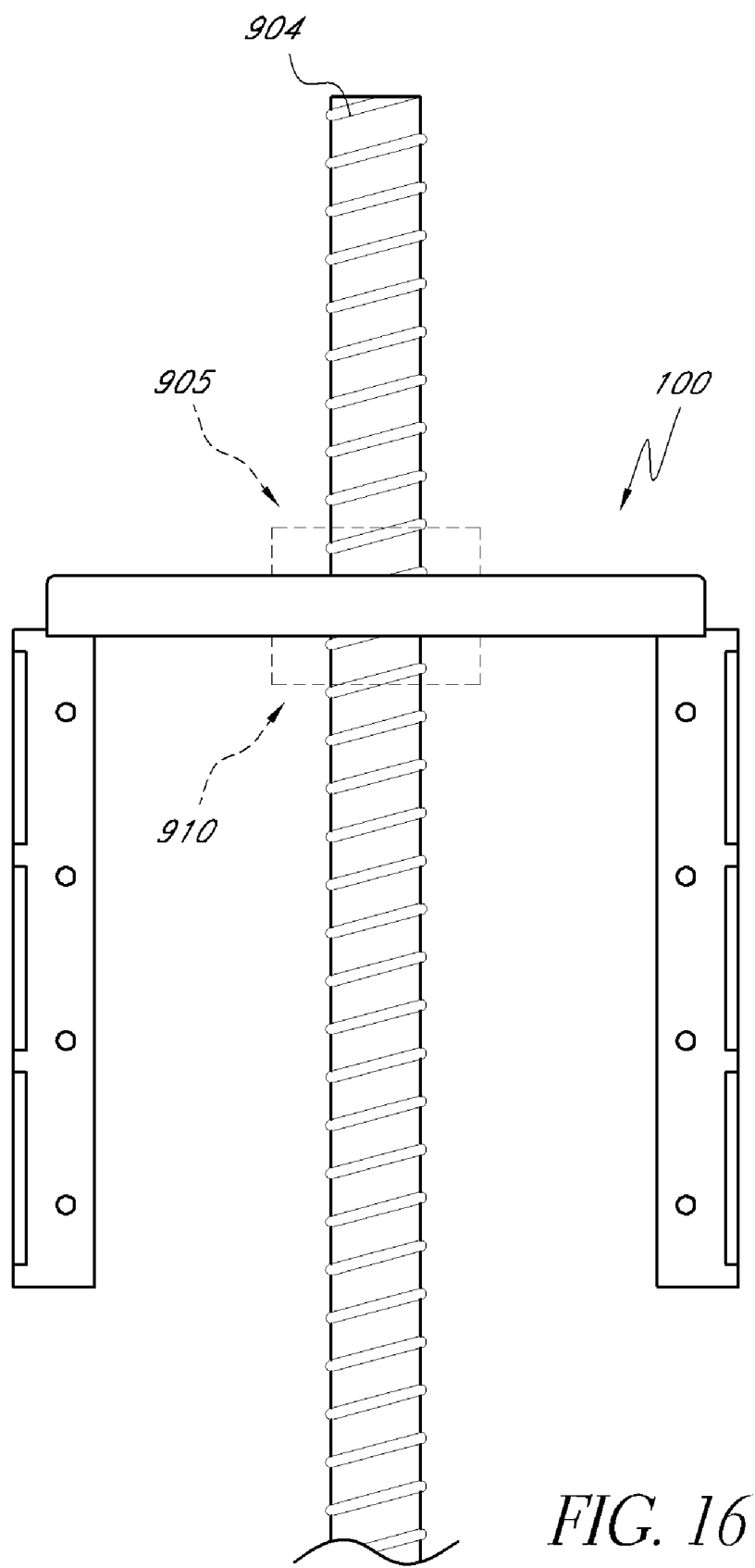
FIG. 16 is a front view of a hold down connector and elongated tie member of the hold down connector assembly of FIG. 15.

FIG. 16 is a front view of the hold down connector 100 and elongated tie member 904 (illustrated as a threaded rod) of FIG. 15. Also shown in FIG. 16, in broken lines, are nuts 905 and 910 engaged with the tie member 904. In some embodiments, only the nut 905 is provided, while in other embodiments both nuts are provided. Of course, it is also possible to provide only the lower nut 910, but that is anticipated to be less desirable. The upper nut 905 acts to resist upward movement of the hold down connector 100 with respect to the tie member 904. Thus, the nut 905 causes the tie member 904 to be in tension in such circumstances. In contrast, the lower nut 910 acts to resist downward movement of the hold down connector 100 with respect to the tie member 904. Thus, the nut 910 causes the tie member 904 to be in compression in such circumstances. The choice of whether to use either one or both of the nuts 905 and 910 depends upon the loads expected during usage, and the desired behavior of the hold down assembly.

The hold down assembly can also include a so-called "take-up device" or "cinch nut" in place of a conventional nut 905. A take-up device grips the elongated tie member and bears down on the transverse portion 102 (FIG. 1) or support plate 401 (FIG. 4), but also responds to downward displacement of the hold down connector 100 (FIG. 1) and building members with respect to the tie member 904, which tends to occur as building members shrink over time. The take-up device responds to this displacement by moving down along the tie member. After this movement the take-up device bears down on the hold down connector 100 in the same manner as the above described nut 905.

FIG. 17 illustrates a hold down connector assembly in accordance with one embodiment. The hold down connector 600 (FIG. 6) can be affixed between substantially parallel elongated building studs. For clarity of presentation, the fasteners (e.g., 220, FIG. 2) and leg reinforcement plates (e.g., 710, 720, 730, FIGS. 8-10) are not shown in FIG. 17. The illustrated hold down connector is engaged with an elongated tie member 904. The illustrated hold down connector assembly includes a nut 905, T-washer 740 (FIG. 11), support blocks 750 (FIG. 12), slotted plate 701 (FIG. 7), and hold down connector 600 (FIG. 6). The elongated tie member 904 can engage with the opening 104, 614 (FIG. 1 and 6) in the transverse portion 102, 602 of the hold down connector 100, 600. In some embodiments the nut or cinch nut engages with a thread, grooves, notches, or other patterns on the surface of the elongated tie member. In some embodiments the slotted plate 701 can be omitted from the hold down connector assembly, such that the support blocks engage with the transverse portion 102, 602 and the T-washer 740. In some embodiments the T-washer can be omitted. For example, the support blocks can be secured to the transverse portion (welding, held in place by the vertical extensions, etc.) and a cinch nut can engage with the tie member and support blocks.

Figure 18A:
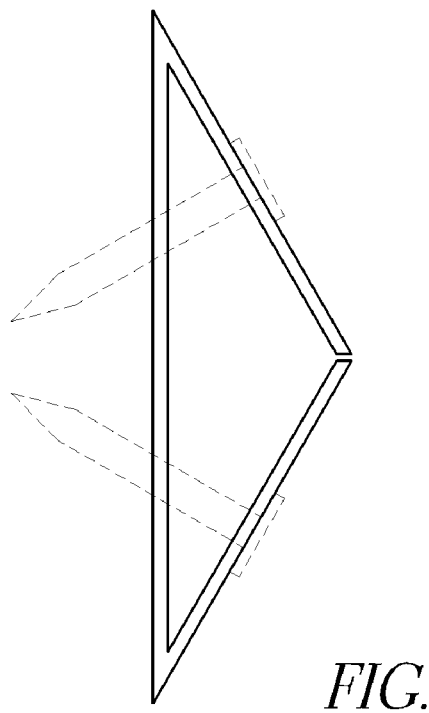
FIGS. 18A-18C are cross-sectional views in accordance with various embodiments of hold down connectors.
Figure 18B:
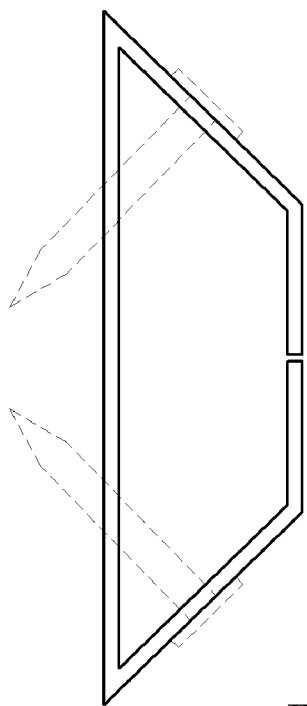
Figure 18C:
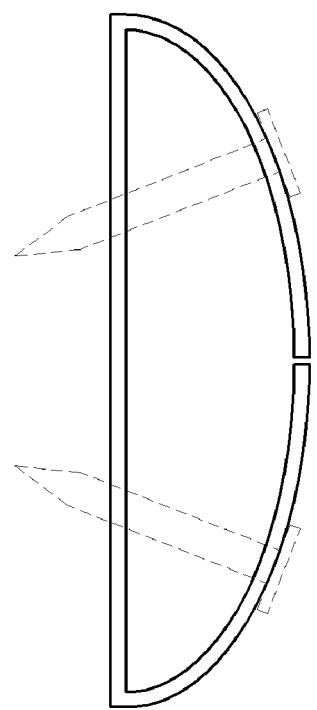

FIGS. 18A-C are transverse cross-sections of differently shaped hold down connector legs in accordance with various embodiments. FIG. 18A is a cross-section of a hold down connector leg with a triangular shape, shown with fasteners extending through the leg. FIG. 18B is a cross-section of a hold down connector leg with a trapezoidal shape. FIG. 18C is a cross-section of a hold down connector leg with a D-shape. In some embodiments, the leg reinforcement plates illustrated in FIGS. 8-10 can be attached to hold down connectors with the transverse leg cross-sections illustrated in FIGS. 18A-C. It will be understood that the shapes of said leg reinforcement plates may need to be modified for compatibility of the differently shaped legs of FIGS. 18A-C.

Figure 19:
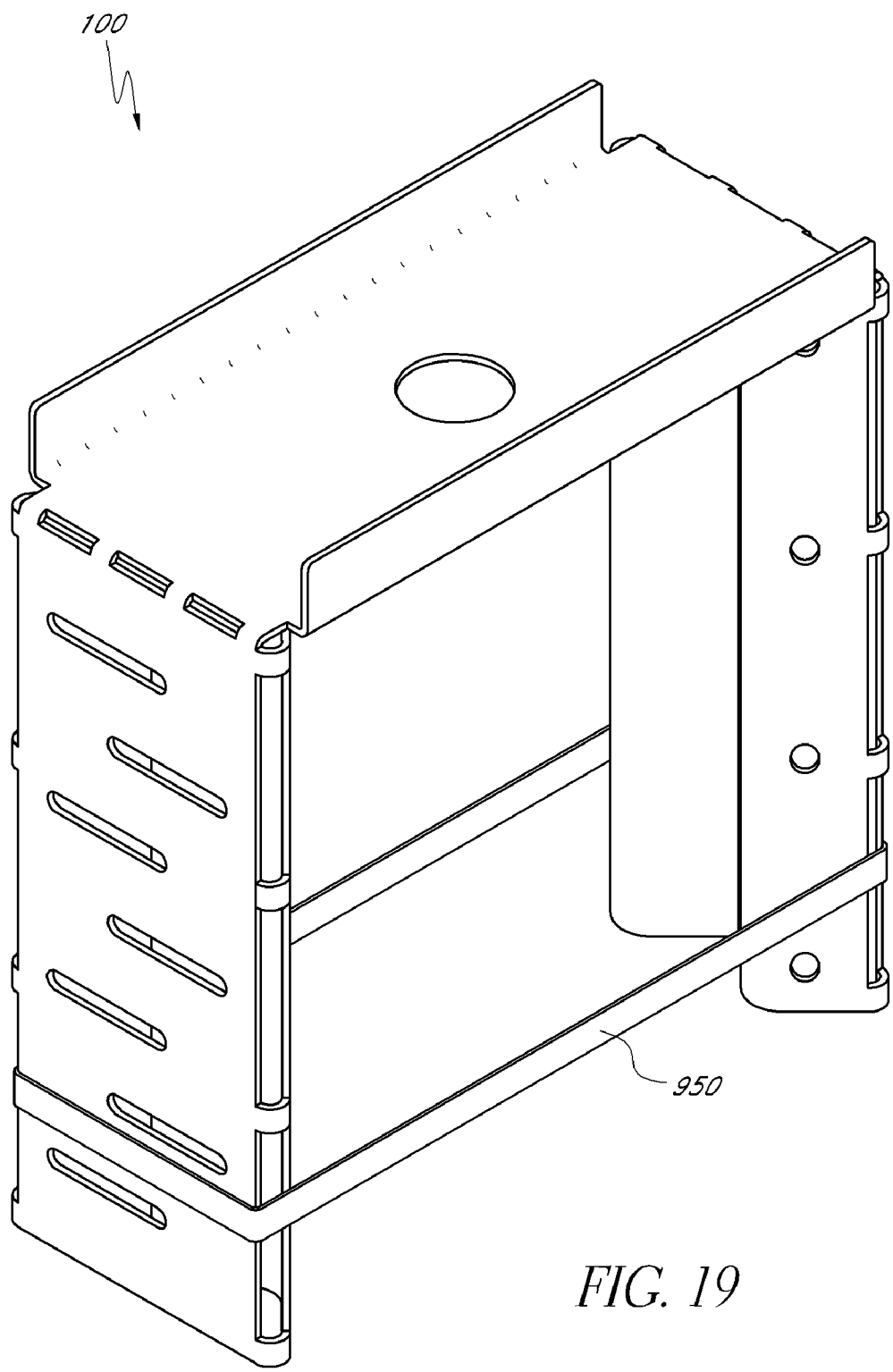
FIG. 19 is a top perspective view of a hold down connector assembly in accordance with another embodiment.

FIG. 19 is a top perspective view of a hold down connector assembly in accordance with another embodiment. The hold down connector assembly illustrated in FIG. 19 includes hold down connector 100 (FIG. 1) and leg support 950. The illustrated leg support 950 provides reinforcement to the legs, preventing the legs from widening or bowing outward when the hold down connector is connected to a tie member in tension. In some embodiments, the leg support 950 can engage with the hold down connector at the bottom of the legs. In some embodiments, the leg support can comprise a rigid or semi-rigid plate or beam that engages (e.g., welded) with both of the legs.

It will also be understood that the leg support is equally applicable to hold down connector 600 (FIG. 6).

In accordance with another aspect of the present invention, a method for securing multiple building members is provided, preferably using the hold down connectors disclosed herein.

The hold down connectors and methods described herein afford a number of advantages over devices known in the art. First, embodiments of the hold down connector can be easily manufactured out of thicker materials than devices known in the art because each of the elongated connections 140, 141, 640, 641, 830 (FIGS. 1, 6, and 14) between the transverse portion 102, 602, 802 and first and second legs 104, 106, 604, 606, 810, 820 contain at least one aperture 130, 131, 630, 631, 832 that facilitates sharper bends of the material of said elongated connections. The thicker construction of embodiments of the hold down connector makes it stronger and results in an ability to bear greater loads.

Second, embodiments of the hold down connector with transverse extensions 110A, 110B, 610A, 610B, (FIGS. 1 and 6) provide additional load bearing capacity by providing additional support to the transverse portion 102, 602 (FIGS. 1 and 6). The transverse extensions provide support for the transverse portion across the cross-sectional areas of the legs.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while one variation of the invention has been shown and described in detail, other modifications, which are within the scope of this invention, will be readily apparent to those of skill in the art based upon this disclosure. It is also contemplated that various combinations or sub-combinations of the specific features and aspects of the embodiment may be made and still fall within the scope of the invention. Thus, it is intended that the scope of the present invention herein disclosed should not be limited by the particular disclosed embodiment described above, but should be determined only by a fair reading of the claims that follow.

We claim:

1. A hold down connector for securing together multiple building members, comprising:
   a first elongated portion configured to laterally receive one or more fasteners for fastening the first portion to an elongated stud, the first portion including a first transverse extension, the first transverse extension including a first extension portion and a second extension portion contiguous with the first extension portion and angled with respect to the first extension portion, the first transverse extension having a free edge;
   a second elongated portion configured to laterally receive one or more fasteners for fastening the second portion to an elongated stud, the second portion substantially parallel to the first portion, the second portion including a second transverse extension, the second transverse extension including a first extension portion and a second extension portion contiguous with the first extension portion and angled with respect to the first extension portion, the second transverse extension having a free edge; and
   a transverse portion having first and second ends, wherein the first end is connected to a top end of the first portion and the second end is connected to a top end of the second portion, the transverse portion having a tie mounting aperture configured to receive an elongated tie member,
   wherein the free edge of the first transverse extension and the free edge of the second transverse extension contact and support the transverse portion.

2. The hold down connector of claim 1, wherein each of the first and second portions includes a main body, the first transverse extension having an elongated connection with the main body of the first portion, the second transverse extension having an elongated connection with the main body of the second portion.

3. The hold down connector of claim 2, wherein the main bodies of the first and second portions comprise plates.

4. The hold down connector of claim 3, wherein the elongated connections are at side edges of the plates.

5. The hold down connector of claim 4, wherein the transverse extensions comprise plates.

6. The hold down connector of claim 2, wherein each of the elongated connections is substantially parallel to longitudinal axes of the first and second portions.

7. The hold down connector of claim 6, wherein the first portion includes two first transverse extensions, each at a side edge of the main body of the first portion, the second portion including two second transverse extensions, each at a side edge of the main body of the second portion.

8. The hold down connector of claim 7, further comprising a leg reinforcement plate configured to engage with and reinforce one of the first and second portions.

9. The hold down connector of claim 8, wherein the leg reinforcement plate comprises a bent plate with one portion bearing against one of the transverse extensions and another portion bearing against another of the transverse extensions.

10. The hold down connector of claim 9, wherein the leg reinforcement plate further comprises a top plate portion configured to be inserted between an underside of the transverse portion and upper edges of the top of the transverse extensions of the hold down connector.

11. The hold down connector of claim 2, further comprising at least one aperture in each of said elongated connections.

12. The hold down connector of claim 5, wherein each of the elongated connections is substantially parallel to longitudinal axes of the first and second portions, the first portion including two first transverse extensions each at a side edge of the main body of the first portion, each of the first transverse extensions extending transversely toward the second portion and forming an angle of less than 90° with respect to the main body of the first portion, the second portion including two second transverse extensions each at a side edge of the main body of the second portion, each of the second transverse extensions extending transversely toward the first portion and forming an angle of less than 90° with respect to the main body of the second portion.

13. The hold down connector of claim 12, wherein the first transverse extensions include ends that are bent back toward the main body of the first portion, the second transverse extensions including ends that are bent back toward the main body of the second portion.

14. The hold down connector of claim 13, wherein each of the first and second transverse extensions has a substantially triangular transverse cross section.

15. The hold down connector of claim 13, wherein each of the first and second transverse extensions has a substantially trapezoidal transverse cross section.

16. The hold down connector of claim 13, wherein the two first transverse extensions form a substantially "W" shaped cross-section, the two second transverse extensions forming a substantially "W" shaped cross-section.

17. The hold down connector of claim 1, wherein the hold down connector includes at least one aperture at an elongated connection between the transverse portion and the first portion, the hold down connector including at least one aperture at an elongated connection between the transverse portion and the second portion.

18. The hold down connector of claim 1, wherein the transverse portion includes at least two vertical extensions, the hold down connector further comprising a reinforcement plate sized to fit between the vertical extensions and bear against and reinforce the transverse portion, wherein the reinforcement plate includes a hole configured to receive an elongated tie member and to be in substantial alignment with the tie mounting aperture when the reinforcement plate is positioned between the vertical extensions.

19. The hold down connector of claim 18, wherein the reinforcement plate hole is an elongated slot.

20. The hold down connector of claim 1, wherein the transverse portion includes at least two vertical extensions, the hold down connector further comprising one or more support blocks sized to fit between the vertical extensions and bear against and reinforce the transverse portion, the hold down connector further comprising a washer configured to receive an elongated tie member and bear against the one or more support blocks.

21. The hold down connector of claim 20, wherein the one or more support blocks are secured to the transverse portion.

22. The hold down connector of claim 1, wherein the transverse portion includes at least two vertical extensions configured to engage with and secure one or more reinforcement members, wherein the vertical extensions are bent towards the center of the transverse portion.

23. The hold down connector of claim 1, further comprising a leg support configured to engage with and bear against the first and second portions and resist widening of a distance between the first and second portions.

24. The hold down connector of claim 1, fastened between substantially parallel building studs.

25. The hold down connector of claim 1, wherein the first transverse extensions extend along an entire length of the first elongated portion, the second transverse extensions extending along an entire length of the second elongated portion.

26. The hold down connector of claim 1, wherein the transverse extensions of the first and second legs are directly connected to the transverse portion.

27. A hold down connector for securing together multiple building members, comprising:
 a first elongated portion configured to laterally receive one or more fasteners for fastening the first portion to an elongated stud;
 a second elongated portion configured to laterally receive one or more fasteners for fastening the second portion to an elongated stud, wherein the second portion is substantially parallel to the first portion; and
 a transverse portion having first and second ends, wherein the first end is connected to an end of the first portion and the second end is connected to an end of the second portion, the transverse portion having a tie mounting hole configured to receive an elongated tie member,
 wherein each of the elongated portions comprises:
 a main body having first and second side edges extending along a longitudinal axis of the elongated portion;
 a first transverse extension comprising:
  a first extension portion extending from the first side edge at an angle less than 90° with respect to the main body; and
  a second extension portion connected to the first extension portion, the second extension portion extending from an inner end of the first extension portion toward a longitudinal axis of the main body; and
 a second transverse extension comprising:
  a third extension portion extending from the second side edge at an angle less than 90° with respect to the main body; and
  a fourth extension portion connected to the third extension portion, the fourth extension portion extending from an inner end of the third extension portion toward the longitudinal axis of the main body.

28. The hold down connector of claim 27, wherein the first and second elongated portions comprise metal with a thickness greater than about 0.0396 inches.

29. The hold down connector of claim 27, wherein the first and second elongated portions comprise metal with a thickness between about 0.0396 inches and about 0.1084 inches.

30. The hold down connector of claim 27, wherein the first, second, and transverse portions are collectively capable of supporting a force of about 10,000 $lb_f$ oriented substantially parallel to the first and second portions.

31. The hold down connector of claim 27, further comprising at least one aperture at an elongated connection between the transverse portion and the first portion and at least one aperture at an elongated connection between the transverse portion and the second portion, wherein the apertures are elongated and oriented in substantial alignment with the elongated connections between the transverse portion and the first and second portions.

32. The hold down connector of claim 27, wherein the transverse portion includes at least two vertical extensions, the hold down connector further comprising a reinforcement plate sized to fit between the vertical extensions and bear against and reinforce the transverse portion, wherein the reinforcement plate includes a hole configured to receive an elongated tie member and be in substantial alignment with the tie-mounting hole when the reinforcement plate is positioned between the vertical extensions.

33. The hold down connector of claim 27, wherein the transverse portion is on top of the first and second portions.

34. The hold down connector of claim 27, fastened between substantially parallel building studs.

35. The hold down connector of claim 27, wherein the tie mounting hole is an elongated slot.

36. The hold down connector of claim 27, as part of a shear wall construction.

37. The hold down connector of claim 27, wherein a length between the first and second ends of the transverse portion is between about 3 inches and about 8 inches.

38. The hold down connector of claim 27, further comprising:
 one or more support blocks configured to reinforce the transverse portion by bearing against the transverse portion or against a member interposed between the transverse portion and the one or more support blocks; and
 a washer including a hole configured to receive an elongated tie member and be in substantial alignment with the tie-mounting hole of the transverse portion, wherein the washer is configured to engage with and bear against the one or more support blocks.

39. The hold down connector of claim 38, wherein the one or more support blocks comprises two elongated support blocks, the washer having a T-shaped cross-section with a lower portion and an upper portion, wherein the lower portion is configured to be interposed between the two support blocks, the hole of the washer being within the washer's lower portion, and the upper portion is configured to engage with and bear against the two support blocks.

40. The hold down connector of claim 38, wherein the one or more support blocks are affixed to the transverse portion.

41. The hold down connector of claim 27, wherein each of the main body and the first through fourth extension portions extends along a majority of the length of the elongated portion.

42. The hold down connector of claim 27, wherein each of the main body and the first through fourth extension portions extends along a substantial entirety of the length of the elongated portion.

43. The hold down connector of claim 27, wherein said at least one of the elongated portions further comprises a leg reinforcement plate secured to at least one of the transverse extensions to reinforce the elongated portion.

44. The hold down connector of claim 43, wherein the leg reinforcement plate bears only against the first extension portion.

45. The hold down connector of claim 43, wherein the leg reinforcement plate comprises an angled plate with one portion bearing against the first extension portion and another portion bearing against the second extension portion.

46. The hold down connector of claim 43, wherein the leg reinforcement plate comprises a bent plate with one portion bearing against the first extension portion and another portion bearing against the third extension portion.

47. The hold down connector of claim 46, wherein the leg reinforcement plate has a substantially triangular cross-section.

48. The hold down connector of claim 46, wherein the leg reinforcement plate further comprises a top plate portion configured to be inserted between the underside of the transverse portion and the upper edges of the transverse extensions of the hold down connector.

49. The hold down connector of claim 27, wherein the first end of the transverse portion is integrally formed with the end of the first portion, and the second end of the transverse portion is integrally formed with the end of the second portion.

50. The hold down connector of claim 49, wherein the first and second elongated portions and the transverse portion are formed from a single plate.

51. A hold down connector for securing together multiple building members, comprising:
   a first elongated portion configured to laterally receive one or more fasteners for fastening the first portion to an elongated stud, the first portion including a first transverse extension;
   a second elongated portion configured to laterally receive one or more fasteners for fastening the second portion to an elongated stud, wherein the second portion is substantially parallel to the first portion, the second portion including a second transverse extension;
   a transverse portion having first and second ends, wherein the first end is connected to an end of the first portion and the second end is connected to an end of the second portion, the transverse portion having a tie mounting hole configured to receive an elongated tie member; and
   a leg reinforcement plate configured to engage with and reinforce one of the first and second portions, the leg reinforcement plate including openings configured to laterally receive the one or more fasteners fastening the elongated portion to the elongated stud,
   wherein the first and second transverse extensions contact and support the transverse portion.

52. The hold down connector of claim 51, wherein at least one of the elongated portions comprises:
   a main body having first and second side edges extending along a longitudinal axis of the elongated portion;
   a first transverse extension comprising:
      a first extension portion extending from the first side edge at an angle less than 90° with respect to the main body; and
      a second extension portion connected to the first extension portion, the second extension portion extending from an inner end of the first extension portion toward the main body; and
   a second transverse extension comprising:
      a third extension portion extending from the second side edge at an angle less than 90° with respect to the main body; and
      a fourth extension portion connected to the third extension portion, the fourth extension portion extending from an inner end of the third extension portion toward the main body;
   wherein the first and second transverse extensions are connected to and/or support the transverse portion.

53. A hold down connector for securing together multiple building members, comprising:
   a first elongated portion configured to laterally receive one or more fasteners for fastening the first portion to an elongated stud, the first portion including a first transverse extension;
   a second elongated portion configured to laterally receive one or more fasteners for fastening the second portion to an elongated stud, wherein the second portion is substantially parallel to the first portion, the second portion including a second transverse extension;
   a transverse portion having first and second ends, wherein the first end is connected to an end of the first portion and the second end is connected to an end of the second portion, the transverse portion having a tie mounting hole configured to receive an elongated tie member, the transverse portion including at least two vertical extensions; and
   a reinforcement plate sized to fit between the vertical extensions and bear against and reinforce the transverse portion on a surface of the transverse portion opposite the elongated portions, wherein the reinforcement plate includes a hole configured to receive an elongated tie member and be in substantial alignment with the tie-mounting hole when the reinforcement plate is positioned between the vertical extensions,
   wherein the first and second transverse extensions contact and support the transverse portion.

\* \* \* \* \*